United States Patent
Bao et al.

(10) Patent No.: US 11,477,613 B2
(45) Date of Patent: Oct. 18, 2022

(54) DIRECT CURRENT (DC) TONE SIGNALING

(71) Applicant: QUALCOMM Incorporated, San Diego, CA (US)

(72) Inventors: Jingchao Bao, San Diego, CA (US); Sony Akkarakaran, Poway, CA (US); Alexandros Manolakos, Escondido, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 33 days.

(21) Appl. No.: 17/031,430

(22) Filed: Sep. 24, 2020

(65) Prior Publication Data
US 2021/0092560 A1 Mar. 25, 2021

Related U.S. Application Data

(60) Provisional application No. 62/905,912, filed on Sep. 25, 2019.

(51) Int. Cl.
*H04W 4/029* (2018.01)
*G01S 5/10* (2006.01)

(52) U.S. Cl.
CPC ............ *H04W 4/029* (2018.02); *G01S 5/10* (2013.01)

(58) Field of Classification Search
CPC ......... H04W 4/029; H04W 4/02; H04W 4/70; G01S 5/10; H04L 5/0032; H04L 5/0048; H04L 5/0069; H04L 5/0091; H04L 5/001; H04L 5/0012; H04L 5/0023; H04L 5/0064; H04L 5/0073; H04B 7/0617
See application file for complete search history.

(56) References Cited

U.S. PATENT DOCUMENTS

| | | | | |
|---|---|---|---|---|
| 2010/0260154 | A1* | 10/2010 | Frank | G01S 5/10 370/336 |
| 2015/0365790 | A1* | 12/2015 | Edge | G01S 19/11 455/404.2 |

(Continued)

FOREIGN PATENT DOCUMENTS

EP 2296329 A2 3/2011

OTHER PUBLICATIONS

International Search Report and Written Opinion—PCT/US2020/052612—ISA/EPO—dated Jan. 18, 2021.

(Continued)

*Primary Examiner* — Kabir A Timory
(74) *Attorney, Agent, or Firm* — MG-IP Law, P.C.

(57) ABSTRACT

Disclosed are techniques for wireless communication. In an aspect, a network entity sends, to a user equipment (UE), a notification of a plurality of direct current (DC) tones of a plurality of network nodes configured to transmit a plurality of positioning signals to the UE, and receives, from the UE, a position of the UE, a plurality of positioning related measurements of the plurality of positioning signals, or any combination thereof. In an aspect, a UE receives, from a network entity, a notification of a plurality of DC tones of a plurality of network nodes, receives, from the plurality of network nodes, a plurality of positioning signals, and determines a plurality of positioning related measurements of the plurality of positioning signals based on locations of the plurality of DC tones indicated in the notification.

30 Claims, 21 Drawing Sheets

(56) References Cited

U.S. PATENT DOCUMENTS

2017/0006458 A1* 1/2017 Wang ................. H04W 56/002
2018/0343635 A1 11/2018 Edge et al.
2019/0053268 A1 2/2019 Strom et al.

OTHER PUBLICATIONS

Partial International Search Report—PCT/US2020/052612—ISA/EPO—dated Nov. 12, 2020.

* cited by examiner

Frequency Layer Set
    Frequency Layer 1
        Reference Point
        Periodicity gNB Set
            gNB 1
                direct/relative offset
                PRS bandwidth
                PRS offset to reference point
                PRS patterns
            gNB 2
                direct/relative offset
                PRS bandwidth
                PRS offset to reference point
                PRS patterns Frequency Layer 2
        Reference Point
        Periodicity gNB Set
            gNB 3
                direct/relative offset
                PRS bandwidth
                PRS offset to reference point
                PRS patterns

Frequency Layer Set
    Frequency Layer 1
        Reference Point
        Periodicity Frequency Layer 2
        Reference Point
        Periodicity gNB Set
    gNB 1
        direct/relative offset
        PRS bandwidth
        PRS offset to reference point
        PRS patterns
        Frequency Layer Set
    gNB 2
        direct/relative offset
        PRS bandwidth
        PRS offset to reference point
        PRS patterns
        Frequency Layer Set
gNB Set
    gNB 3
        direct/relative offset
        PRS bandwidth
        PRS offset to reference point
        PRS patterns
        Frequency Layer Set

FIG. 12

DIRECT CURRENT (DC) TONE SIGNALING

CROSS-REFERENCE TO RELATED APPLICATIONS

The present Application for Patent claims the benefit of U.S. Provisional Application No. 62/905,912, entitled "DC TONE SIGNALING," filed Sep. 25, 2019, assigned to the assignee hereof, and expressly incorporated herein by reference in its entirety.

BACKGROUND OF THE DISCLOSURE

1. Field of the Disclosure

Various aspects described herein generally relate to wireless communication systems, and more particularly, to signaling direct current (DC) tones, e.g., in positioning operations.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communication (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

One or more aspects may be directed to a network entity. The network entity may comprise a memory, a communication device, and at least one processor communicatively coupled to the memory and the communication device. The at least one processor may be configured to cause the communication device to send, to a user equipment (UE), a notification of a plurality of direct current (DC) tones of a plurality of network nodes configured to transmit a plurality of positioning signals to the UE. The at least one processor may also be configured to receive, from the UE via the communication device, a position of the UE, and/or a plurality of positioning related measurements of the plurality of positioning signals.

One or more aspects may be directed to a method of a network entity. The method may comprise sending, to a UE, a notification of a plurality of DC tones of a plurality of network nodes configured to transmit a plurality of positioning signals to the UE. The method may also comprise receiving, from the UE, a position of the UE, and/or a plurality of positioning related measurements of the plurality of positioning signals.

One or more aspects may also be directed to a network entity. The network entity may comprise means for sending, to a UE, a notification of a plurality of DC tones of a plurality of network nodes configured to transmit a plurality of positioning signals to the UE. The network entity may also comprise means for receiving, from the UE, a position of the UE, and/or a plurality of positioning related measurements of the plurality of positioning signals.

One or more aspects may be directed a non-transitory computer-readable medium storing computer-executable instructions for a network entity. The computer-executable instructions may comprise one or more instructions causing the network entity to send, to a UE, a notification of a plurality of DC tones of a plurality of network nodes configured to transmit a plurality of positioning signals to the UE. The computer-executable instructions may also comprise one or more instructions causing the network entity to receive, from the UE, a position of the UE, and/or a plurality of positioning related measurements of the plurality of positioning signals.

One or more aspects may be directed to a UE. The UE may comprise a memory; at least one transceiver, and at least one processor communicatively coupled to the memory and the at least one transceiver. The at least one processor may be configured to receive, from a network entity via the at least one transceiver, a notification of a plurality of DC tones of a plurality of network nodes. The at least one processor may also be configured to receive, from the plurality of network nodes via the at least one transceiver, a plurality of positioning signals. The at least one processor may further be configured to determine a plurality of positioning related measurements of the plurality of positioning signals based on locations of the plurality of DC tones indicated in the notification.

One or more aspects may be directed to a method of a UE. The method may comprise receiving, from a network entity, a notification of a plurality of DC tones of a plurality of network nodes. The method may also comprise receiving, from the plurality of network nodes, a plurality of positioning signals. The method may further comprise determining a plurality of positioning related measurements of the plurality of positioning signals based on locations of the plurality of DC tones indicated in the notification.

One or more aspects may also be directed to a UE. The UE may comprise means for receiving, from a network entity, a notification of a plurality of DC tones of a plurality of network nodes. The UE may also comprise means for receiving, from the plurality of network nodes, a plurality of positioning signals. The UE may further comprise means for determining a plurality of positioning related measurements of the plurality of positioning signals based on locations of the plurality of DC tones indicated in the notification.

One or more aspects may be directed a non-transitory computer-readable medium storing computer-executable instructions for a UE. The computer-executable instructions may comprise one or more instructions causing the UE to receive, from a network entity, a notification of a plurality of DC tones of a plurality of network nodes. The computer-executable instructions may also comprise one or more instructions causing the UE to receive, from the plurality of network nodes, a plurality of positioning signals. The computer-executable instructions may further comprise one or more instructions causing the UE to determine a plurality of positioning related measurements of the plurality of positioning signals based on locations of the plurality of DC tones indicated in the notification.

One or more aspects may further be directed to a network entity. The network entity may comprise a memory, a communication device, and at least one processor communicatively coupled to the memory and the communication device. The at least one processor may be configured to receive, via the communication device, a notification of an uplink DC tone of a UE. The at least one processor may also be configured to cause the communication device to send the notification to a plurality of network nodes configured to receive one or more positioning signals from the UE. The at least one processor may further be configured to receive, from the plurality of network nodes via the communication device, a plurality of positioning related measurements of the one or more positioning signals transmitted from the UE. The at least one processor may yet further be configured to determine a position of the UE based on the plurality of positioning related measurements.

One or more aspects may also be directed to a method of a network entity. The method may comprise receiving a notification of an uplink DC tone of a UE. The method may also comprise sending the notification to a plurality of network nodes configured to receive one or more positioning signals from the UE. The method may further comprise receiving, from the plurality of network nodes, a plurality of positioning related measurements of the one or more positioning signals transmitted from the UE. The method may yet further comprise determining a position of the UE based on the plurality of positioning related measurements.

One or more aspects may additionally be directed to a network entity. The network entity may comprise means for receiving a notification of an uplink DC tone of a UE. The network entity may also comprise means for sending the notification to a plurality of network nodes configured to receive one or more positioning signals from the UE. The network entity may further comprise means for receiving, from the plurality of network nodes, a plurality of positioning related measurements of the one or more positioning signals transmitted from the UE. The network entity may yet further comprise means for determining a position of the UE based on the plurality of positioning related measurements.

One or more aspects may also be directed a non-transitory computer-readable medium storing computer-executable instructions for a network entity. The computer-executable instructions may comprise one or more instructions causing the network entity to receive a notification of an uplink DC tone of a UE. The computer-executable instructions may also comprise one or more instructions causing the network entity to send the notification to a plurality of network nodes configured to receive one or more positioning signals from the UE. The computer-executable instructions may further comprise one or more instructions causing the network entity to receive, from the plurality of network nodes, a plurality of positioning related measurements of the one or more positioning signals transmitted from the UE. The computer-executable instructions may yet further comprise one or more instructions causing the network entity to determine a position of the UE based on the plurality of positioning related measurements.

One or more aspects may further be directed to a base station. The base station may comprise a memory, a communication device, and at least one processor communicatively coupled to the memory and the communication device. The at least one processor may be configured to receive, from a UE via the communication device, a notification of an uplink DC tone of the UE and to cause the communication device to transmit the notification to a network entity for distribution to a plurality of network nodes.

One or more aspects may also be directed to a method of a base station. The method may comprise receiving, from a UE, a notification of an uplink DC tone of the UE and transmitting the notification to a network entity for distribution to a plurality of network nodes.

One or more aspects may additionally be directed to a base station. The base station may comprise means for receiving, from a UE, a notification of an uplink DC tone of the UE and means for transmitting the notification to a network entity for distribution to a plurality of network nodes.

One or more aspects may also be directed a non-transitory computer-readable medium storing computer-executable instructions for a base station. The computer-executable instructions may comprise one or more instructions causing the base station to receive, from a UE, a notification of an uplink DC tone of the UE, and one or more instructions causing the base station to transmit the notification to a network entity for distribution to a plurality of network nodes.

One or more aspects may be directed to network node. The network node may comprise a memory, a communication device, and at least one processor communicatively coupled to the memory and the communication device. The at least one processor may be configured to receive, from a network entity via the communication device, a notification of a DC tone of a UE. The at least one processor may also be configured to receive, from the UE via the communication device, one or more positioning signals. The at least one processor may further be configured to determine positioning related measurements of the one or more positioning signals based on the notification.

One or more aspects may also be directed to a method of a network entity. The method may comprise receiving, from a network entity, a notification of a DC tone of a UE. The method may also comprise receiving, from the UE, one or more positioning signals. The method may further comprise determining positioning related measurements of the one or more positioning signals based on the notification.

One or more aspects may also be directed to a network entity. The network entity may comprise means for receiving, from a network entity, a notification of a DC tone of a UE. The network entity may also comprise means for receiving, from the UE, one or more positioning signals. The network entity may further comprise means for determining positioning related measurements of the one or more positioning signals based on the notification.

One or more aspects may also be directed a non-transitory computer-readable medium storing computer-executable instructions for a network entity. The computer-executable instructions may comprise one or more instructions causing the network entity to receive, from a network entity, a notification of a DC tone of a UE. The computer-executable instructions may also comprise one or more instructions causing the network entity to receive, from the UE, one or more positioning signals. The computer-executable instructions may further comprise one or more instructions causing the network entity to determine positioning related measurements of the one or more positioning signals based on the notification.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of examples of one or more aspects of the disclosed subject matter and are provided solely for illustration of the examples and not limitation thereof:

FIGS. 11 and 12 illustrate example structures of information elements to facilitate informing of direct current tones.

DETAILED DESCRIPTION

Figure 1:
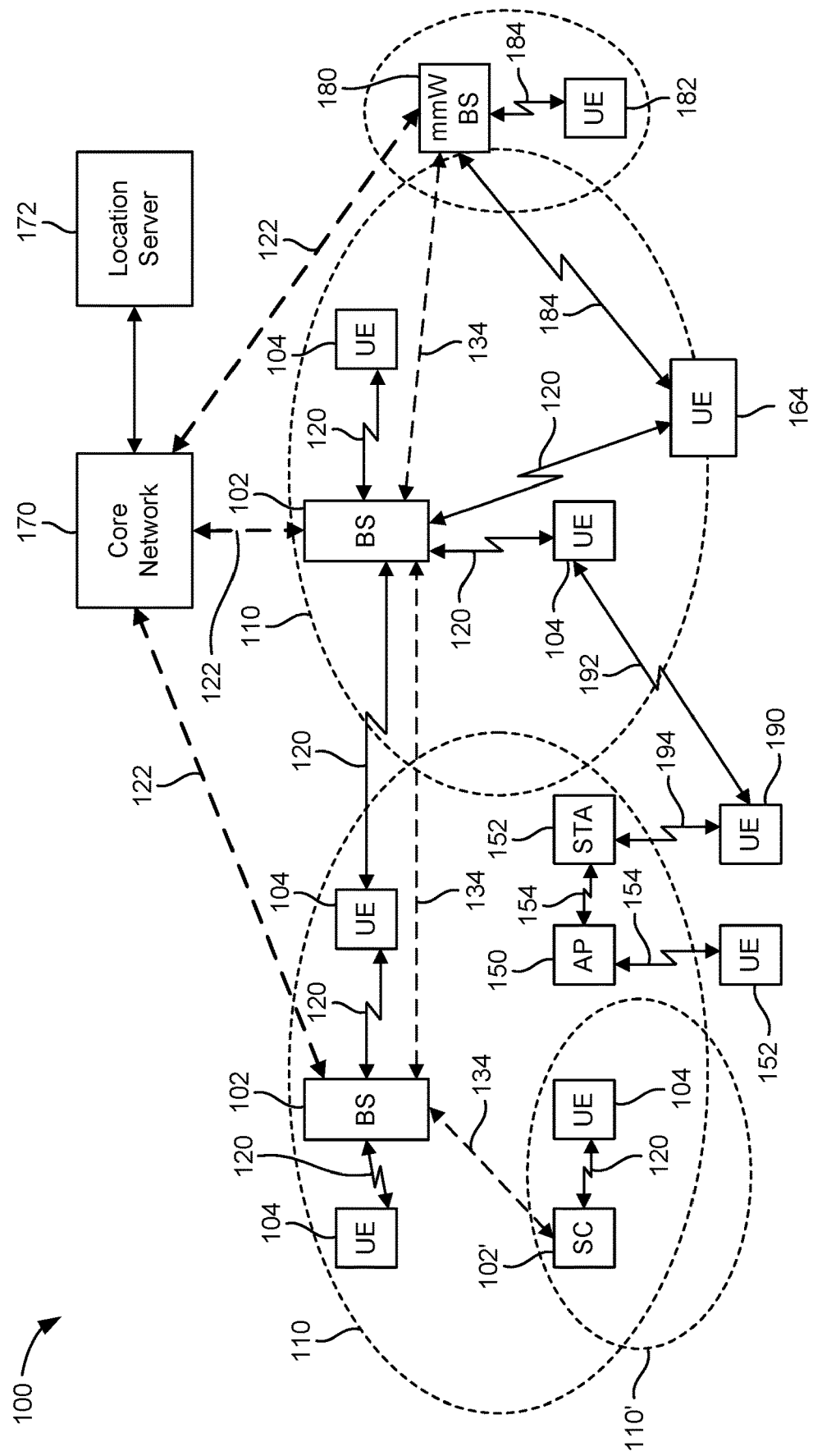
FIG. 1 illustrates an exemplary wireless communications system, according to various aspects of the disclosure.

Various aspects described herein generally relate to wireless communication systems, and more particularly, to notifying a user equipment (UE) of direct current (DC) tones of multiple network nodes (e.g., base stations, gNBs, gNodeBs, eNBs, eNodeBs., etc.), and/or notifying the multiple network nodes of the DC tone of the UE. In this way, when signals are received on the DC tones, appropriate compensating actions may be taken.

These and other aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile device," a "mobile terminal," a "mobile station," or variations thereof.

Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on Institute of Electrical and Electronics (IEEE) 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

According to various aspects, FIG. 1 illustrates an exemplary wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while canceling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive one or more reference downlink reference signals (e.g., positioning reference signals (PRS), tracking reference signals (TRS), phase tracking reference signal (PTRS), cell-specific reference signals (CRS), channel state information reference signals (CSI-RS), primary synchronization signals (PSS), secondary synchronization signals (SSS), synchronization signal blocks (SSBs), etc.) from a base station. The UE can then form a transmit beam for sending one or more uplink reference signals (e.g., uplink positioning reference signals (UL-PRS), sounding reference signal (SRS), demodulation reference signals (DMRS), PTRS, etc.) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

Figure 2A:
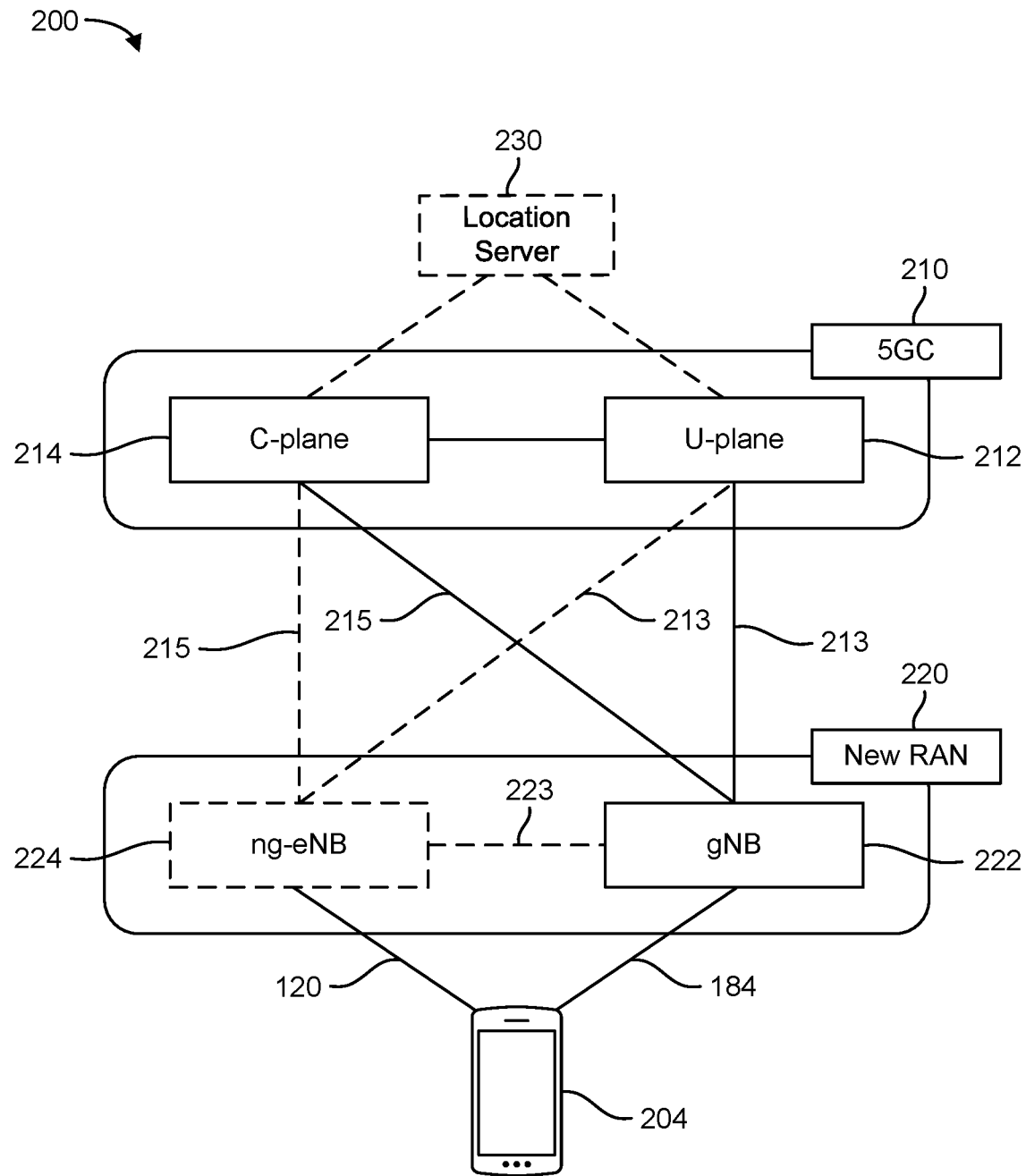
FIGS. 2A and 2B illustrate example wireless network structures, according to various aspects of the disclosure.

According to various aspects, FIG. 2A illustrates an example wireless network structure 200. For example, a 5GC 210 (also referred to as a Next Generation Core (NGC)) can be viewed functionally as control plane functions 214 (e.g., UE registration, authentication, network access, gateway selection, etc.) and user plane functions 212, (e.g., UE gateway function, access to data networks, Internet protocol (IP) routing, etc.) which operate cooperatively to form the core network. User plane interface (NG-U) 213 and control plane interface (NG-C) 215 connect the gNB 222 to the 5GC 210 and specifically to the control plane functions 214 and user plane functions 212. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). Another optional aspect may include location server 230, which may be in communication with the 5GC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network.

Figure 2B:
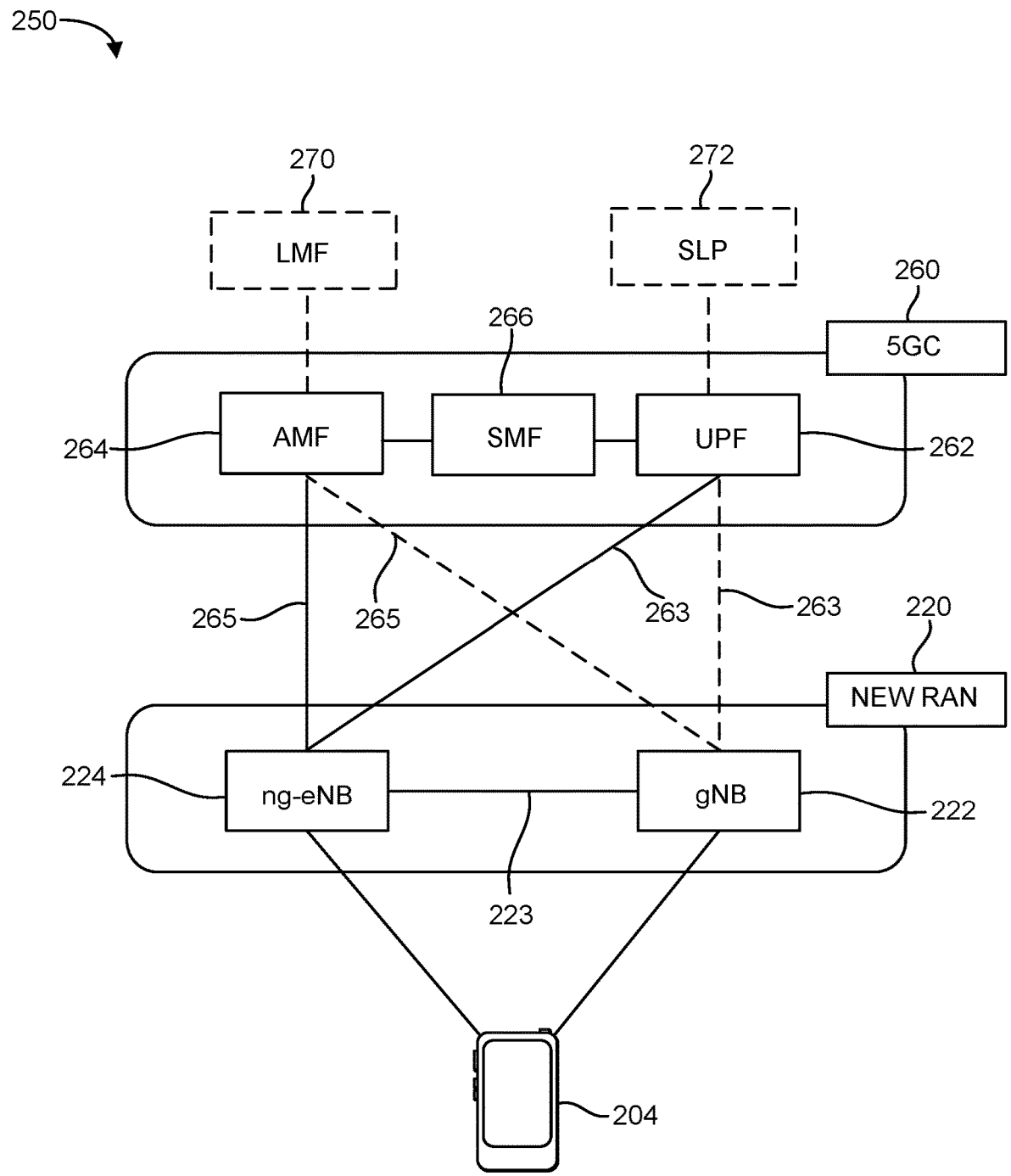

According to various aspects, FIG. 2B illustrates another example wireless network structure 250. For example, a 5GC 260 can be viewed functionally as control plane functions, provided by an access and mobility management function (AMF) 264, and user plane functions, provided by a user plane function (UPF) 262, which operate cooperatively to form the core network (i.e., 5GC 260). User plane interface 263 and control plane interface 265 connect the ng-eNB 224 to the 5GC 260 and specifically to UPF 262 and AMF 264, respectively. In an additional configuration, a gNB 222 may also be connected to the 5GC 260 via control plane interface 265 to AMF 264 and user plane interface 263 to UPF 262. Further, ng-eNB 224 may directly communicate with gNB 222 via the backhaul connection 223, with or without gNB direct connectivity to the 5GC 260. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). The base stations of the New RAN 220 communicate with the AMF 264 over the N2 interface and with the UPF 262 over the N3 interface.

The functions of the AMF 264 include registration management, connection management, reachability management, mobility management, lawful interception, transport for session management (SM) messages between the UE 204 and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the New RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as a secure user plane location (SUPL) location platform (SLP) 272.

The functions of the SMF 266 include session management, UE IP address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, New RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

In an aspect, the LMF 270 and/or the SLP 272 may be integrated into a base station, such as the gNB 222 and/or the ng-eNB 224. When integrated into the gNB 222 and/or the ng-eNB 224, the LMF 270 and/or the SLP 272 may be referred to as a "location management component," or "LMC." However, as used herein, references to the LMF 270 and the SLP 272 include both the case in which the LMF 270 and the SLP 272 are components of the core network (e.g., 5GC 260) and the case in which the LMF 270 and the SLP 272 are components of a base station.

Figure 3A:
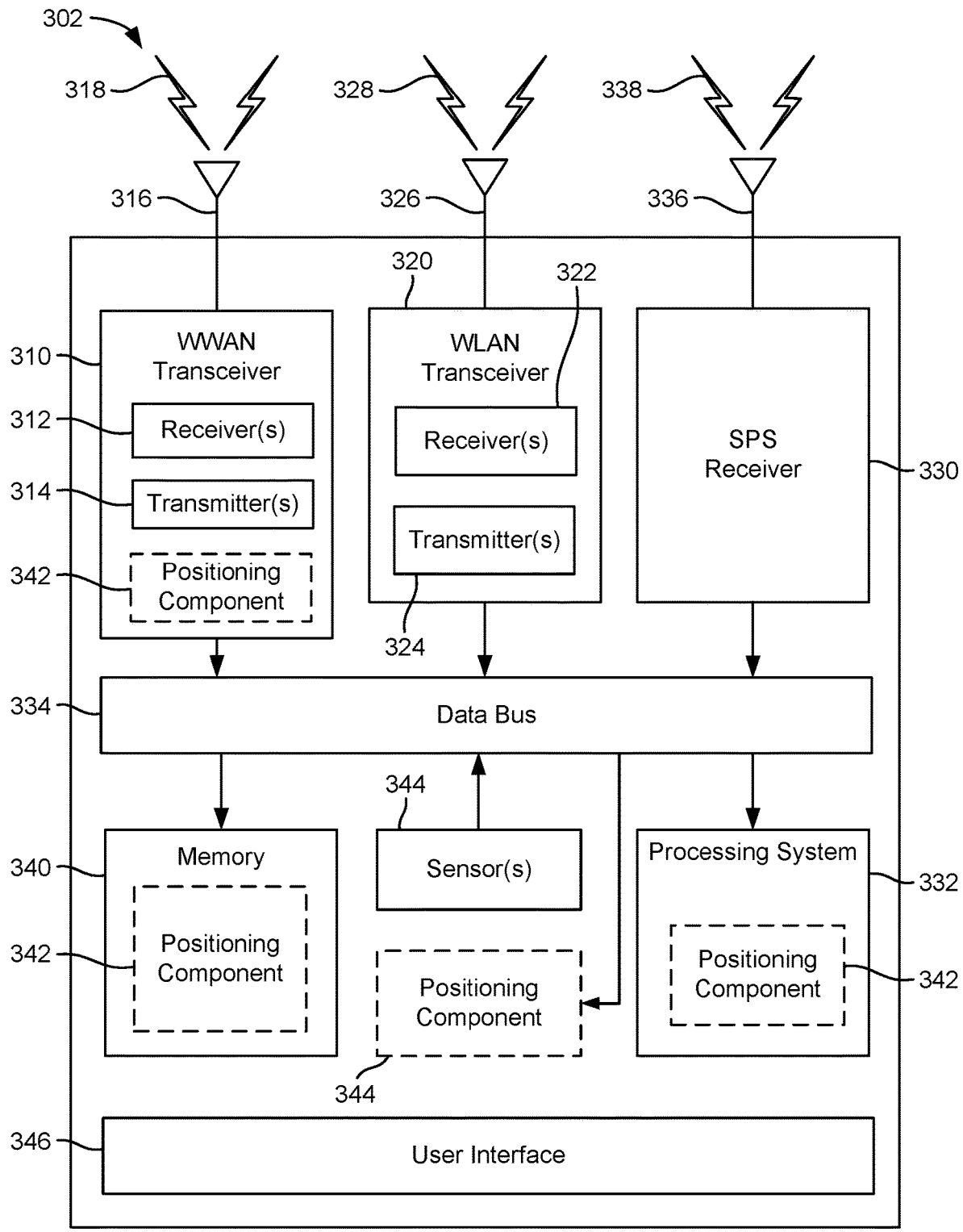
FIGS. 3A to 3C are simplified block diagrams of several sample aspects of components that may be employed in wireless communication nodes and configured to support communication as taught herein.
Figure 3B:
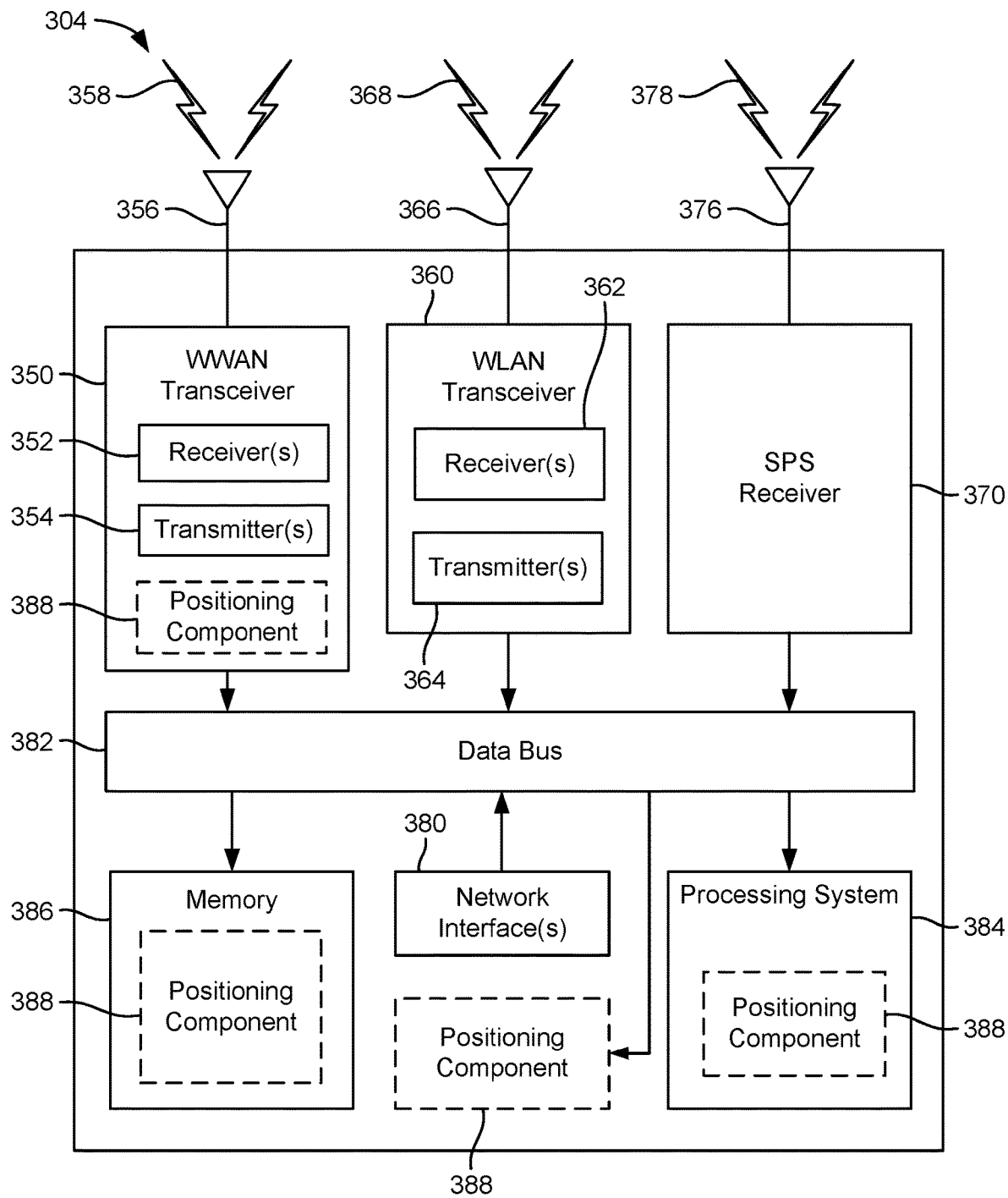
Figure 3C:
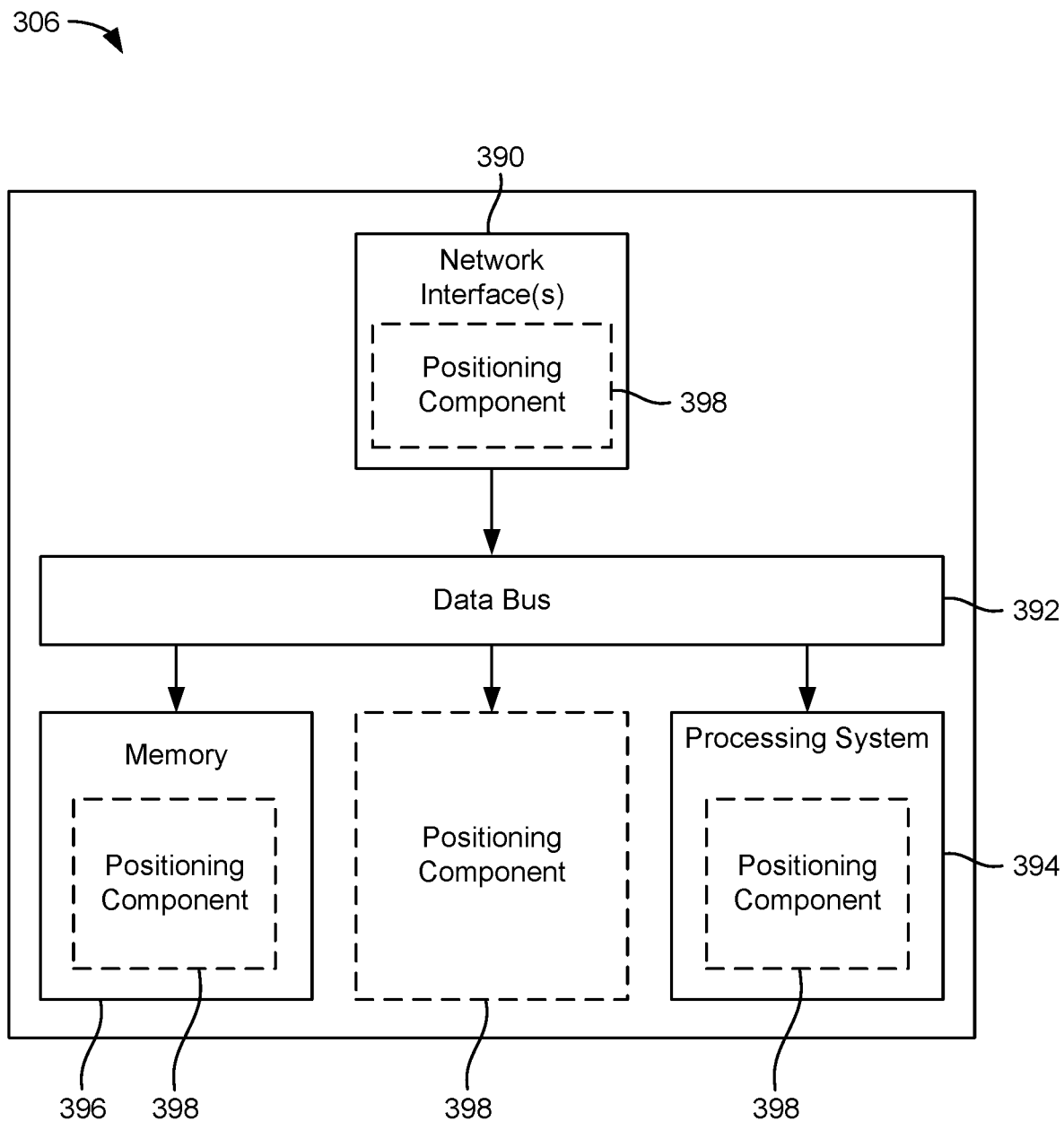

FIGS. 3A, 3B, and 3C illustrate several exemplary components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include wireless wide area network (WWAN) transceiver 310 and 350, respectively, configured to communicate via one or more wireless communication networks (not shown), such as an NR network, an LTE network, a GSM network, and/or the like. The WWAN transceivers 310 and 350 may be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 also include, at least in some cases, wireless local area network (WLAN) transceivers 320 and 360, respectively. The WLAN transceivers 320 and 360 may be connected to one or more antennas 326 and 366, respectively, for communicating with other network nodes, such as other UEs, access points, base stations, etc., via at least one designated RAT (e.g., WiFi, LTE-D, Bluetooth®, etc.) over a wireless communication medium of interest. The WLAN transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the WLAN transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively.

Transceiver circuitry including at least one transmitter and at least one receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 316, 326, 356, 366), such as an antenna array, that permits the respective apparatus to perform transmit "beamforming," as described herein. Similarly, a receiver may include or be coupled to a plurality of antennas (e.g., antennas 316, 326, 356, 366), such as an antenna array, that permits the respective apparatus to perform receive beamforming, as described herein. In an aspect, the transmitter and receiver may share the same plurality of antennas (e.g., antennas 316, 326, 356, 366), such that the respective apparatus can only receive or transmit at a given time, not both at the same time. A wireless communication device (e.g., one or both of the transceivers 310 and 320 and/or 350 and 360) of the UE 302 and/or the base station 304 may also comprise a network listen module (NLM) or the like for performing various measurements.

The UE 302 and the base station 304 also include, at least in some cases, satellite positioning systems (SPS) receivers 330 and 370. The SPS receivers 330 and 370 may be connected to one or more antennas 336 and 376, respectively, for receiving SPS signals 338 and 378, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 330 and 370 may comprise any suitable hardware and/or software for receiving and processing SPS signals 338 and 378, respectively. The SPS receivers 330 and 370 request information and operations as appropriate from the other systems, and performs calculations necessary to determine positions of the UE 302 and the base station 304 using measurements obtained by any suitable SPS algorithm.

The base station 304 and the network entity 306 each include at least one network interfaces 380 and 390 for communicating with other network entities. For example, the network interfaces 380 and 390 (e.g., one or more network access ports) may be configured to communicate with one or more network entities via a wire-based or wireless backhaul connection. In some aspects, the network interfaces 380 and 390 may be implemented as transceivers configured to support wire-based or wireless signal communication. This communication may involve, for example, sending and receiving messages, parameters, and/or other types of information.

The UE 302, the base station 304, and the network entity 306 also include other components that may be used in conjunction with the operations as disclosed herein. The UE 302 includes processor circuitry implementing a processing system 332 for providing functionality relating to, for example, wireless positioning, and for providing other processing functionality. The base station 304 includes a processing system 384 for providing functionality relating to, for example, wireless positioning as disclosed herein, and for providing other processing functionality. The network entity 306 includes a processing system 394 for providing functionality relating to, for example, wireless positioning as disclosed herein, and for providing other processing functionality. In an aspect, the processing systems 332, 384, and 394 may include, for example, one or more general purpose processors, multi-core processors, ASICs, digital signal processors (DSPs), field programmable gate arrays (FPGA), or other programmable logic devices or processing circuitry.

The UE 302, the base station 304, and the network entity 306 include memory circuitry implementing memory components 340, 386, and 396 (e.g., each including a memory device), respectively, for maintaining information (e.g., information indicative of reserved resources, thresholds, parameters, and so on). In some cases, the UE 302, the base station 304, and the network entity 306 may include positioning components 342, 388, and 398, respectively. The positioning components 342, 388, and 398 may be hardware circuits that are part of or coupled to the processing systems 332, 384, and 394, respectively, that, when executed, cause the UE 302, the base station 304, and the network entity 306 to perform the functionality described herein. In other aspects, the positioning components 342, 388, and 398 may be external to the processing systems 332, 384, and 394 (e.g., part of a modem processing system, integrated with another processing system, etc.). Alternatively, the positioning components 342, 388, and 398 may be memory modules stored in the memory components 340, 386, and 396, respectively, that, when executed by the processing systems 332, 384, and 394 (or a modem processing system, another processing system, etc.), cause the UE 302, the base station 304, and the network entity 306 to perform the functionality described herein. FIG. 3A illustrates possible locations of the positioning component 342, which may be part of the WWAN transceiver 310, the memory component 340, the processing system 332, or any combination thereof, or may be a standalone component. FIG. 3B illustrates possible locations of the positioning component 388, which may be part of the WWAN transceiver 350, the memory component 386, the processing system 384, or any combination thereof, or may be a standalone component. FIG. 3C illustrates possible locations of the positioning component 398, which may be part of the network interface(s) 390, the memory component 396, the processing system 394, or any combination thereof, or may be a standalone component.

The UE 302 may include one or more sensors 344 coupled to the processing system 332 to provide movement and/or orientation information that is independent of motion data derived from signals received by the WWAN transceiver 310, the WLAN transceiver 320, and/or the SPS receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in 2D and/or 3D coordinate systems.

In addition, the UE 302 includes a user interface 346 for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the processing system 384 in more detail, in the downlink, IP packets from the network entity 306 may be provided to the processing system 384. The processing system 384 may implement functionality for an RRC layer, a packet data convergence protocol (PDCP) layer, a radio link control (RLC) layer, and a medium access control (MAC) layer. The processing system 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the processing system 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the processing system 332, which implements Layer-3 and Layer-2 functionality.

In the uplink, the processing system 332 provides demultiplexing between transport and logical channels, packet reassembly, deciphering, header decompression, and control signal processing to recover IP packets from the core network. The processing system 332 is also responsible for error detection.

Similar to the functionality described in connection with the downlink transmission by the base station 304, the processing system 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARM), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the processing system 384.

In the uplink, the processing system 384 provides demultiplexing between transport and logical channels, packet reassembly, deciphering, header decompression, control signal processing to recover IP packets from the UE 302. IP packets from the processing system 384 may be provided to the core network. The processing system 384 is also responsible for error detection.

For convenience, the UE 302, the base station 304, and/or the network entity 306 are shown in FIGS. 3A-C as including various components that may be configured according to the various examples described herein. It will be appreciated, however, that the illustrated blocks may have different functionality in different designs.

The various components of the UE 302, the base station 304, and the network entity 306 may communicate with each other over data buses 334, 382, and 392, respectively. The components of FIGS. 3A-C may be implemented in various ways. In some implementations, the components of FIGS. 3A-C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a positioning entity," etc. However, as will be appreciated, such operations, acts, and/or functions may actually be performed by specific components or combinations of components of the UE, base station, positioning entity, etc., such as the processing systems 332, 384, 394, the transceivers 310, 320, 350, and 360, the memory components 340, 386, and 396, the positioning components 342, 388, and 398, etc.

NR supports a number of cellular network-based positioning technologies, including downlink-based, uplink-based, and downlink-and-uplink-based positioning methods. Downlink-based positioning methods include observed time difference of arrival (OTDOA) in LTE, downlink time difference of arrival (DL-TDOA) in NR, and downlink angle-of-departure (DL-AoD) in NR. In an OTDOA or DL-TDOA positioning procedure, a UE measures the differences between the times of arrival (ToAs) of reference signals (e.g., PRS, TRS, CSI-RS, SSB, etc.) received from pairs of base stations, referred to as reference signal time difference (RSTD) or time difference of arrival (TDOA) measurements, and reports them to a positioning entity. More specifically, the UE receives the identifiers of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity can estimate the UE's location. For DL-AoD positioning, a base station measures the angle and other channel properties (e.g., signal strength) of the downlink transmit beam used to communicate with a UE to estimate the location of the UE.

Uplink-based positioning methods include uplink time difference of arrival (UL-TDOA) and uplink angle-of-arrival (UL-AoA). UL-TDOA is similar to DL-TDOA, but is based on uplink reference signals (e.g., SRS) transmitted by the UE. For UL-AoA positioning, a base station measures the angle and other channel properties (e.g., gain level) of the uplink receive beam used to communicate with a UE to estimate the location of the UE.

Downlink-and-uplink-based positioning methods include enhanced cell-ID (E-CID) positioning and multi-round-trip-time (RTT) positioning (also referred to as "multi-cell RTT"). In an RTT procedure, an initiator (a base station or a UE) transmits an RTT measurement signal (e.g., a PRS or SRS) to a responder (a UE or base station), which transmits an RTT response signal (e.g., an SRS or PRS) back to the initiator. The RTT response signal includes the difference between the ToA of the RTT measurement signal and the transmission time of the RTT response signal, referred to as the reception-to-transmission (Rx-Tx) measurement. The initiator calculates the difference between the transmission time of the RTT measurement signal and the ToA of the RTT response signal, referred to as the "Tx-Rx" measurement. The propagation time (also referred to as the "time of flight") between the initiator and the responder can be calculated from the Tx-Rx and Rx-Tx measurements. Based on the propagation time and the known speed of light, the distance between the initiator and the responder can be determined. For multi-RTT positioning, a UE performs an RTT procedure with multiple base stations to enable its location to be triangulated based on the known locations of the base stations. RTT and multi-RTT methods can be combined with other positioning techniques, such as UL-AoA and DL-AoD, to improve location accuracy.

The E-CID positioning method is based on radio resource management (RRM) measurements. In E-CID, the UE reports the serving cell identifier (ID), the timing advance (TA), and the identifiers, estimated timing, and signal strength of detected neighbor base stations. The location of the UE is then estimated based on this information and the known locations of the base stations.

To assist positioning operations, a location server (e.g., location server 230, LMF 270, SLP 272) may provide assistance data to the UE. For example, the assistance data may include identifiers of the base stations (or the cells/ TRPs of the base stations) from which to measure reference signals, the reference signal configuration parameters (e.g., the number of consecutive positioning slots, periodicity of positioning slots, muting sequence, frequency hopping sequence, reference signal ID, reference signal bandwidth, slot offset, etc.), and/or other parameters applicable to the particular positioning method. Alternatively, the assistance data may originate directly from the base stations themselves (e.g., in periodically broadcasted overhead messages, etc.). In some cases, the UE may be able to detect neighbor network nodes itself without the use of assistance data.

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

Figure 4:
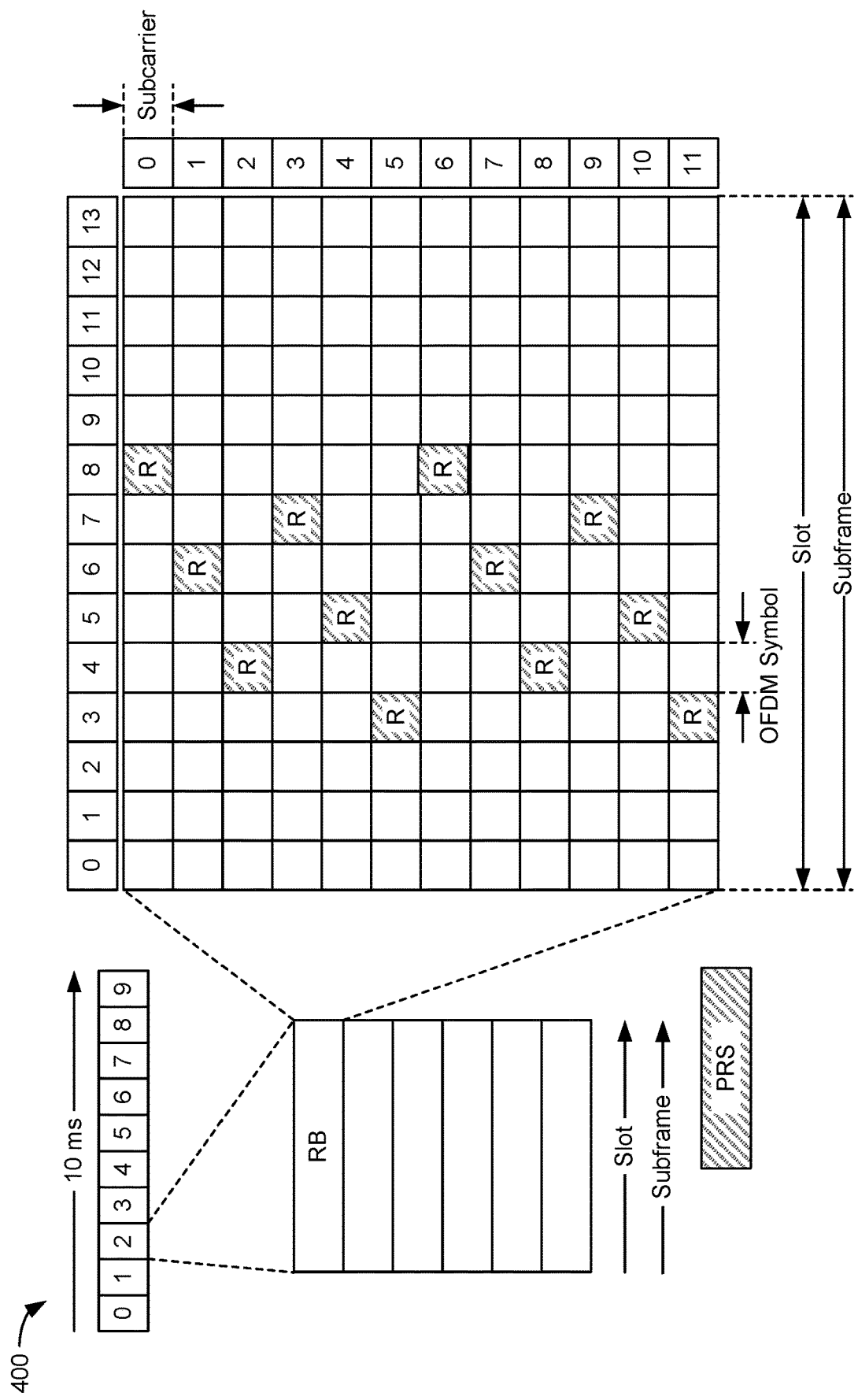
FIGS. 4 and 5 are diagrams illustrating example frame structures and channels within the frame structures, according to various aspects of the disclosure.
Figure 5:
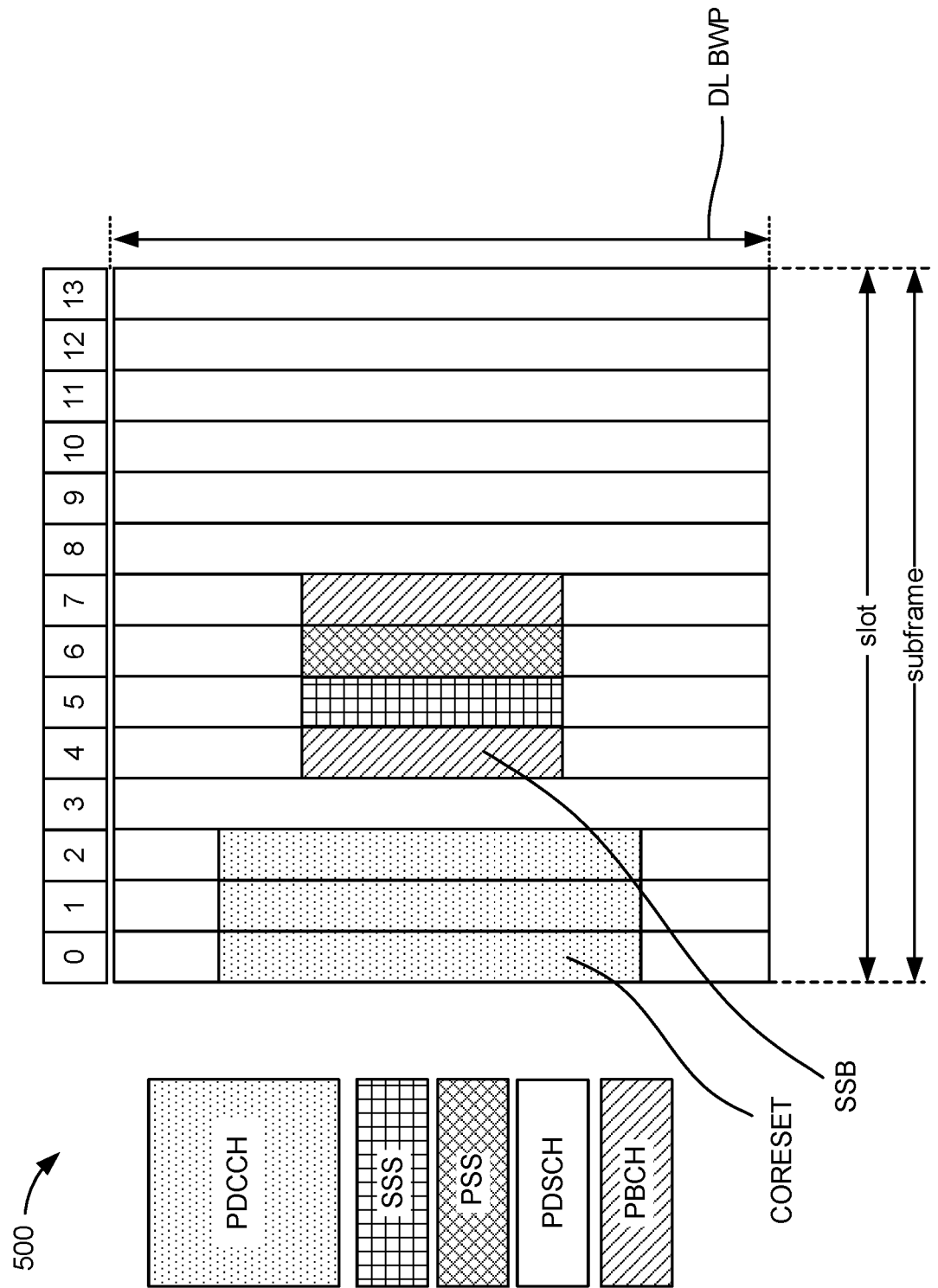

Various frame structures may be used to support downlink and uplink transmissions between network nodes (e.g., base stations and UEs). FIG. 4 is a diagram 400 illustrating an example of a downlink frame structure, according to aspects of the disclosure. FIG. 5 is a diagram 500 illustrating an example of channels within the downlink frame structure, according to aspects of the disclosure. Other wireless communications technologies may have different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing, symbol length, etc.). In contrast, NR may support multiple numerologies (µ), for example, subcarrier spacing of 15 kHz, 30 kHz, 60 kHz, 120 kHz, and 240 kHz or greater may be available. Table 1 provided below lists some various parameters for different NR numerologies.

TABLE 1

| µ | SCS (kHz) | Symbols/ Sot | Slots/ Subframe | Slots/ Frame | Slot Duration (ms) | Symbol Duration (µs) | Max. nominal system BW (MHz) with 4K FFT size |
|---|---|---|---|---|---|---|---|
| 0 | 15 | 14 | 1 | 10 | 1 | 66.7 | 50 |
| 1 | 30 | 14 | 2 | 20 | 0.5 | 33.3 | 100 |
| 2 | 60 | 14 | 4 | 40 | 0.25 | 16.7 | 100 |
| 3 | 120 | 14 | 8 | 80 | 0.125 | 8.33 | 400 |
| 4 | 240 | 14 | 16 | 160 | 0.0625 | 4.17 | 800 |

In the example of FIGS. 4 and 5, a numerology of 15 kHz is used. Thus, in the time domain, a 10 millisecond (ms) frame is divided into 10 equally sized subframes of 1 ms each, and each subframe includes one time slot. In FIGS. 4 and 5, time is represented horizontally (e.g., on the X axis) with time increasing from left to right, while frequency is represented vertically (e.g., on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIGS. 4 and 5, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

Some of the REs carry downlink reference (pilot) signals (DL-RS). The DL-RS may include PRS, TRS, PTRS, CRS, CSI-RS, DMRS, PSS, SSS, SSB, etc. FIG. 4 illustrates exemplary locations of REs carrying PRS (labeled "R").

A collection of resource elements (REs) that are used for transmission of PRS is referred to as a "PRS resource." The collection of resource elements can span multiple PRBs in the frequency domain and 'N' (e.g., 1 or more) consecutive symbol(s) within a slot in the time domain. In a given OFDM symbol in the time domain, a PRS resource occupies consecutive PRBs in the frequency domain.

The transmission of a PRS resource within a given PRB has a particular comb size (also referred to as the "comb density"). A comb size 'N' represents the subcarrier spacing (or frequency/tone spacing) within each symbol of a PRS resource configuration. Specifically, for a comb size 'N,' PRS are transmitted in every Nth subcarrier of a symbol of a PRB. For example, for comb-4, for each of the fourth symbols of the PRS resource configuration, REs corresponding to every fourth subcarrier (e.g., subcarriers 0, 4, 8) are used to transmit PRS of the PRS resource. Currently, comb sizes of comb-2, comb-4, comb-6, and comb-12 are supported for DL-PRS. FIG. 4 illustrates an exemplary PRS resource configuration for comb-6 (which spans six symbols). That is, the locations of the shaded REs (labeled "R") indicate a comb-6 PRS resource configuration.

A "PRS resource set" is a set of PRS resources used for the transmission of PRS signals, where each PRS resource has a PRS resource ID. In addition, the PRS resources in a PRS resource set are associated with the same TRP. A PRS resource set is identified by a PRS resource set ID and is associated with a particular TRP (identified by a TRP ID). In addition, the PRS resources in a PRS resource set have the same periodicity, a common muting pattern configuration, and the same repetition factor (e.g., PRS-ResourceRepetitionFactor) across slots. The periodicity is the time from the first repetition of the first PRS resource of a first PRS instance to the same first repetition of the same first PRS resource of the next PRS instance. The periodicity may have a length selected from $2^\mu \cdot \{4, 5, 8, 10, 16, 20, 32, 40, 64, 80, 160, 320, 640, 1280, 2560, 5120, 10240\}$ slots, with $\mu=0, 1, 2, 3$. The repetition factor may have a length selected from $\{1, 2, 4, 6, 8, 16, 32\}$ slots.

A PRS resource ID in a PRS resource set is associated with a single beam (and/or beam ID) transmitted from a single TRP (where a TRP may transmit one or more beams). That is, each PRS resource of a PRS resource set may be transmitted on a different beam, and as such, a "PRS resource," or simply "resource," can also be referred to as a "beam." Note that this does not have any implications on whether the TRPs and the beams on which PRS are transmitted are known to the UE.

A "PRS instance" or "PRS occasion" is one instance of a periodically repeated time window (e.g., a group of one or more consecutive slots) where PRS are expected to be transmitted. A PRS occasion may also be referred to as a "PRS positioning occasion," a "PRS positioning instance, a "positioning occasion," "a positioning instance," a "positioning repetition," or simply an "occasion," an "instance," or a "repetition."

A "positioning frequency layer" (also referred to simply as a "frequency layer") is a collection of one or more PRS resource sets across one or more TRPs that have the same values for certain parameters. Specifically, the collection of PRS resource sets has the same subcarrier spacing (SCS) and cyclic prefix (CP) type (meaning all numerologies supported for the physical downlink shared channel (PDSCH) are also supported for PRS), the same Point A, the same value of the downlink PRS bandwidth, the same start PRB (and center frequency), and the same comb-size. The Point A parameter takes the value of the parameter ARFCN-ValueNR (where "ARFCN" stands for "absolute radio-frequency channel number") and is an identifier/code that specifies a pair of physical radio channel used for transmission and reception. The downlink PRS bandwidth may have a granularity of four PRBs, with a minimum of 24 PRBs and a maximum of 272 PRBs. Currently, up to four frequency layers have been defined, and up to two PRS resource sets may be configured per TRP per frequency layer.

The concept of a frequency layer is somewhat like the concept of component carriers and bandwidth parts (BWPs), but different in that component carriers and BWPs are used by one base station (or a macro cell base station and a small cell base station) to transmit data channels, while frequency layers are used by several (usually three or more) base stations to transmit PRS. A UE may indicate the number of frequency layers it can support when it sends the network its positioning capabilities, such as during an LTE positioning protocol (LPP) session. For example, a UE may indicate whether it can support one or four positioning frequency layers.

FIG. 5 illustrates an example of various channels within a downlink slot of a radio frame. In NR, the channel bandwidth, or system bandwidth, is divided into multiple BWPs. A BWP is a contiguous set of PRBs selected from a contiguous subset of the common RBs for a given numerology on a given carrier. Generally, a maximum of four BWPs can be specified in the downlink and uplink. That is, a UE can be configured with up to four BWPs on the downlink, and up to four BWPs on the uplink. Only one BWP (uplink or downlink) may be active at a given time, meaning the UE may only receive or transmit over one BWP at a time. On the downlink, the bandwidth of each BWP should be equal to or greater than the bandwidth of the SSB, but it may or may not contain the SSB.

Referring to FIG. 5, a primary synchronization signal (PSS) is used by a UE to determine subframe/symbol timing and a physical layer identity. A secondary synchronization signal (SSS) is used by a UE to determine a physical layer cell identity group number and radio frame timing. Based on the physical layer identity and the physical layer cell identity group number, the UE can determine a PCI. Based on the PCI, the UE can determine the locations of the aforementioned DL-RS. The physical broadcast channel (PBCH), which carries an MIB, may be logically grouped with the PSS and SSS to form an SSB (also referred to as an SS/PBCH). The MIB provides a number of RBs in the downlink system bandwidth and a system frame number (SFN). The PDSCH carries user data, broadcast system information not transmitted through the PBCH, such as system information blocks (SIBs), and paging messages.

The physical downlink control channel (PDCCH) carries downlink control information (DCI) within one or more control channel elements (CCEs), each CCE including one or more RE group (REG) bundles (which may span multiple symbols in the time domain), each REG bundle including one or more REGs, each REG corresponding to 12 resource elements (one resource block) in the frequency domain and one OFDM symbol in the time domain. The set of physical resources used to carry the PDCCH/DCI is referred to in NR as the control resource set (CORESET). In NR, a PDCCH is confined to a single CORESET and is transmitted with its own DMRS. This enables UE-specific beamforming for the PDCCH.

In the example of FIG. 5, there is one CORESET per BWP, and the CORESET spans three symbols (although it could be only one or two symbols) in the time domain. Unlike LTE control channels, which occupy the entire system bandwidth, in NR, PDCCH channels are localized to a specific region in the frequency domain (i.e., a CORESET). Thus, the frequency component of the PDCCH shown in FIG. 5 is illustrated as less than a single BWP in the frequency domain. Note that although the illustrated CORESET is contiguous in the frequency domain, it need not be. In addition, the CORESET may span less than three symbols in the time domain.

The DCI within the PDCCH carries information about uplink resource allocation (persistent and non-persistent) and descriptions about downlink data transmitted to the UE. Multiple (e.g., up to eight) DCIs can be configured in the PDCCH, and these DCIs can have one of multiple formats. For example, there are different DCI formats for uplink scheduling, for non-MIMO downlink scheduling, for MIMO downlink scheduling, and for uplink power control. A PDCCH may be transported by 1, 2, 4, 8, or 16 CCEs in order to accommodate different DCI payload sizes or coding rates.

In OFDM physical layers, the direct current (DC) tone is the tone (subcarrier) whose frequency is equal to the RF center frequency of the transmitting network node. It corresponds to frequency zero (direct current) if the FFT signal is not modulated. Due to the local oscillator leakage, signals mapped at DC tones are more vulnerable to noise (e.g., interference). For example, in FIG. 4, if the DC tone of a network node (e.g., a base station) is tone (subcarrier) '2,' then any signal transmitted on tone '2' may be vulnerable to noise. Thus, if positioning signals from a network node are mapped to a DC tone of that network node (e.g., the darkened RE on tone '2' and symbol '4'), measurements of those positioning signals may be difficult. Also, even if measured, the measurements may not be accurate. In LTE, in order to simplify digital-to-analogue- and analogue-to-digital converter operations, the DC tone is null (i.e., it does not carry any signaling). However, in NR, the DC subcarrier can be used based on the assumption that modern transceivers are able to manage the impact of local oscillator leakage.

If the UE is aware of the DC tone of a network node, then the UE may take measures to compensate for positioning signals mapped to the DC tone. A network node currently serving the UE, i.e., the serving network node, may inform the UE of its DC tone. However, measurements of multiple network nodes may be necessary (e.g., at least three for a two-dimensional location estimate, or at least four for a three-dimensional location estimate) to determine the location of the UE. Unfortunately, the UE cannot take compensation measures if it is not aware of the DC tones of the network nodes.

To address this and other issues, in an aspect, it is proposed to provide one or more techniques to inform the UE of the DC tones of multiple network nodes that will be transmitting positioning signals (e.g., PRS) to a UE. The UE then may take compensation measures for any positioning signals that may be mapped to the DC tones. For example, the UE may deemphasize, or even ignore altogether, measurements of the positioning signals mapped to the DC tones. In another aspect, the UE may transmit positioning signals (e.g., SRS) to be measured by multiple network nodes. In this aspect, it is proposed to inform the DC tone of the UE to the multiple network nodes.

Figure 6:
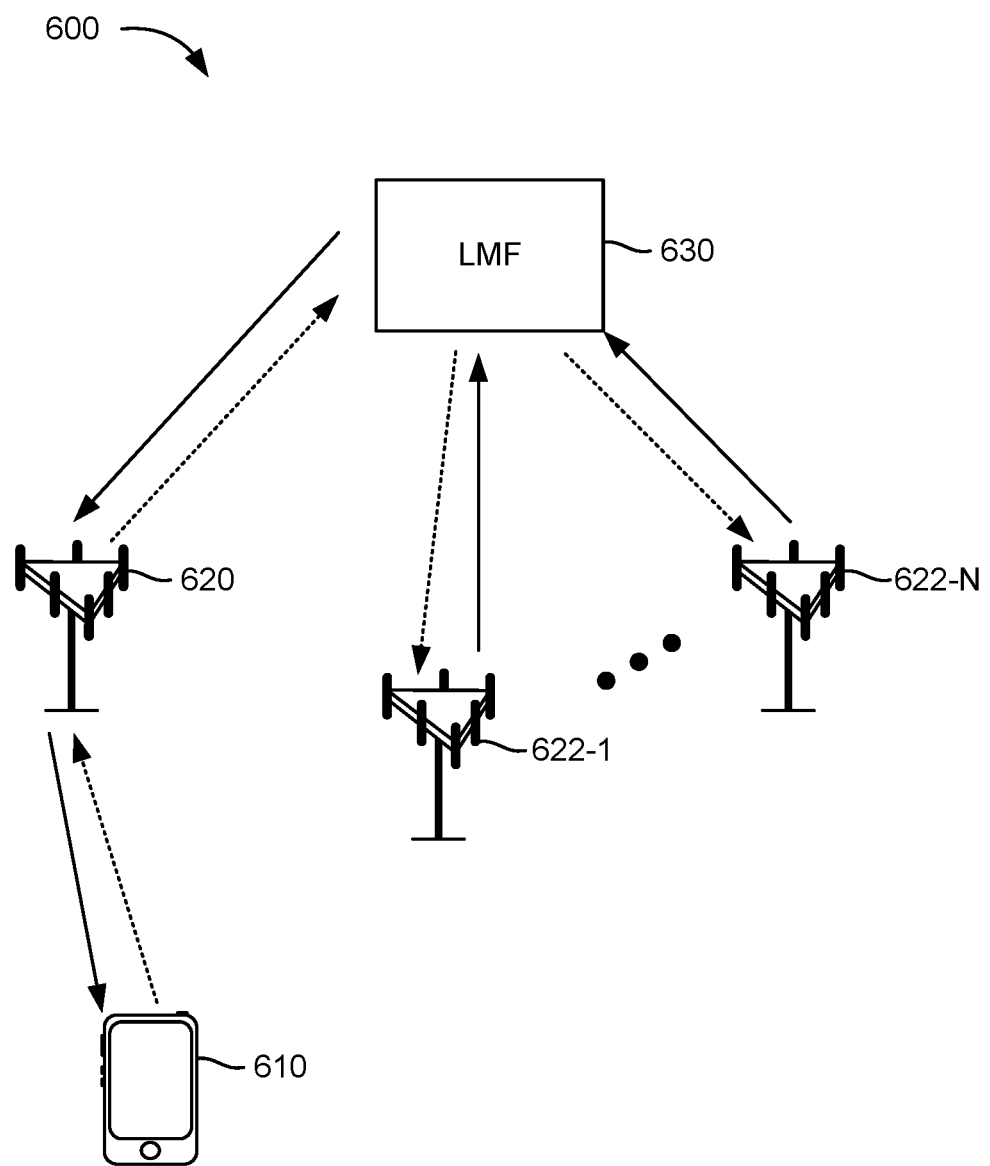
FIGS. 6 and 7 illustrate example scenarios of informing a user equipment of direct current tones of a plurality of network nodes and/or informing the plurality of network nodes of a direct current tone of the user equipment, according to various aspects of the disclosure.

FIG. 6 illustrates an example scenario 600 of informing a UE of DC tones of a plurality of network nodes and/or informing the plurality of network nodes of the DC tone of the UE. In scenario 600, a UE 610 may be served by a serving network node 620. There may also be one or more neighboring network nodes 622-1 . . . 622-N configured to transmit DL positioning signals to the UE 610 and/or receive UL positioning signals from the UE 610. A location server 630, illustrated as an LMF, may be configured to manage or otherwise enable determining the UE's 610 location.

In FIG. 6, the solid arrows represent a downlink communication flow (from the perspective of the UE 610) to inform the UE 610 of the DC tones of the plurality of network nodes 620, 622-1 . . . 622-N. The location server 630 may first gather the DC tones of the plurality of network nodes 620, 622-1 . . . 622-N. As seen, each network node 620, 622-1 . . . 622-N may inform the location server 630 of its DC tone. The network nodes 620, 622-1 . . . 622-N may provide the DC tones on their own initiatives and/or in response to queries from the location server 630. For example, NR positioning protocol type A (NRPPa) or LTE positioning protocol type A (LPPa) messages may be exchanged between the network nodes 620, 622-1 . . . 622-N and the location server 630.

After gathering the plurality of DC tones of the plurality of network nodes 620, 622-1 . . . 622-N, the location server 630 may send a notification to the UE 610 of the plurality of DC tones. In an aspect, the location server 630 may send assistance data to the UE 610. For example, LPP messages may be exchanged between the UE 610 and the location server 630. In this instance, the serving network node 620 may facilitate the communication between the UE 610 and the location server 630.

Alternatively or in addition thereto, dashed arrows in FIG. 6 represent an uplink communication flow (from the perspective of the UE 610) to inform the plurality of network nodes 620, 622-1 . . . 622-N of the DC tone of the UE 610. The location server 630 may first gather the uplink DC tone of the UE 610 and a shift7dot5 KHz parameter. The shift7dot5 KHz parameter is a half tone shift indicator for the uplink and is a unique information element (IE) for uplink transmission. As seen, the UE 610 may inform the location server 630 of its DC tone and shift7dot5 KHz parameter (collectively, "DC tone information"). The UE 610 may provide the DC tone information on its own initiatives or in response to a query from the location server 630. For example, LPP messages may be exchanged between the UE 610 and the location server 630 requesting and transmitting the DC tone information. The serving network node 620 may facilitate the communication between the UE 610 and the location server 630. Specifically, the serving network node 620 may transmit the UE's 610 DC tone information to the location server 630 over the NRPPa interface on its own initiatives or in response to a query from the location server 630. Thereafter, the location server 630 may notify the network nodes 620, 622-1 . . . 622-N. For example, NRPPa or LPPa messages may be exchanged between the network nodes 620, 622-1 . . . 622-N and the location server 630.

Figure 7:
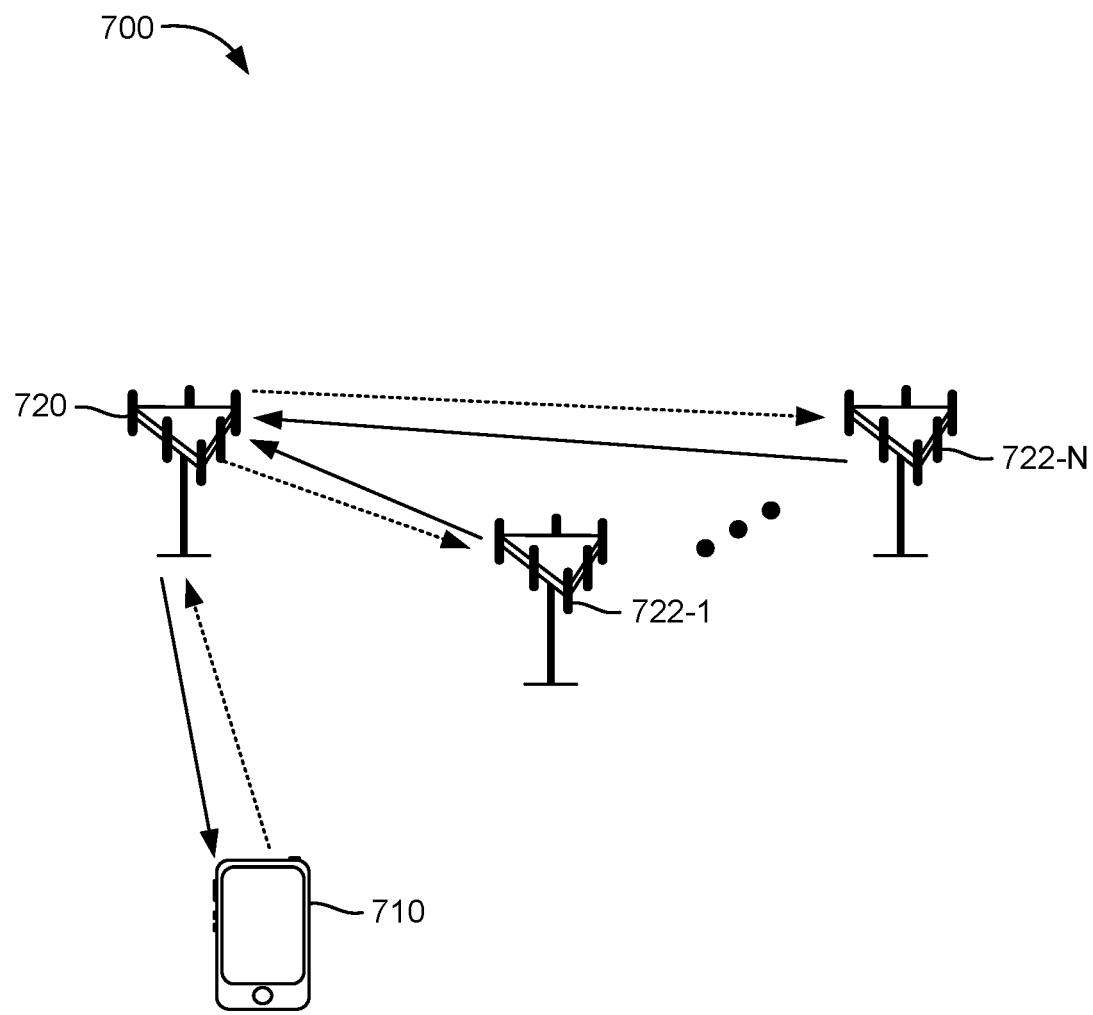

FIG. 7 illustrates another example scenario 700 of informing a UE 710 of DC tones of a plurality of network nodes 720, 722-1 . . . 722-N and/or informing the plurality of network nodes 720, 722-1 . . . 722-N of the DC tone of the UE 710. In scenario 700, the serving network node 720 may be manage or otherwise enable determining the UE 710 location. That is, the serving network node 720 may also play the role of the location server. In scenario 700, interfaces such as Xn, X2, etc. may be used to exchange messages among the plurality of network nodes 720, 722-1 . . . 722-N (e.g., between the serving network node 720 and neighboring network nodes 722-1 . . . 722-N).

The following discussion focuses on the downlink side, i.e., notifying the UE of the DC tones of the plurality of network nodes configured to transmit positioning signals to the UE. It is noted, however, that the techniques described herein will be readily applicable on the uplink side.

As indicated, signals mapped to DC tones of a network node are more vulnerable to noise. This is due in large part to local oscillator leakage at the network node. The UE may take compensation measures if it is aware of the DC tones of the network nodes that will be transmitting the positioning signals. For example, the positioning signals (e.g., PRS) mapped at these DC tones can be assigned less weight in the positioning estimation.

Figure 8:
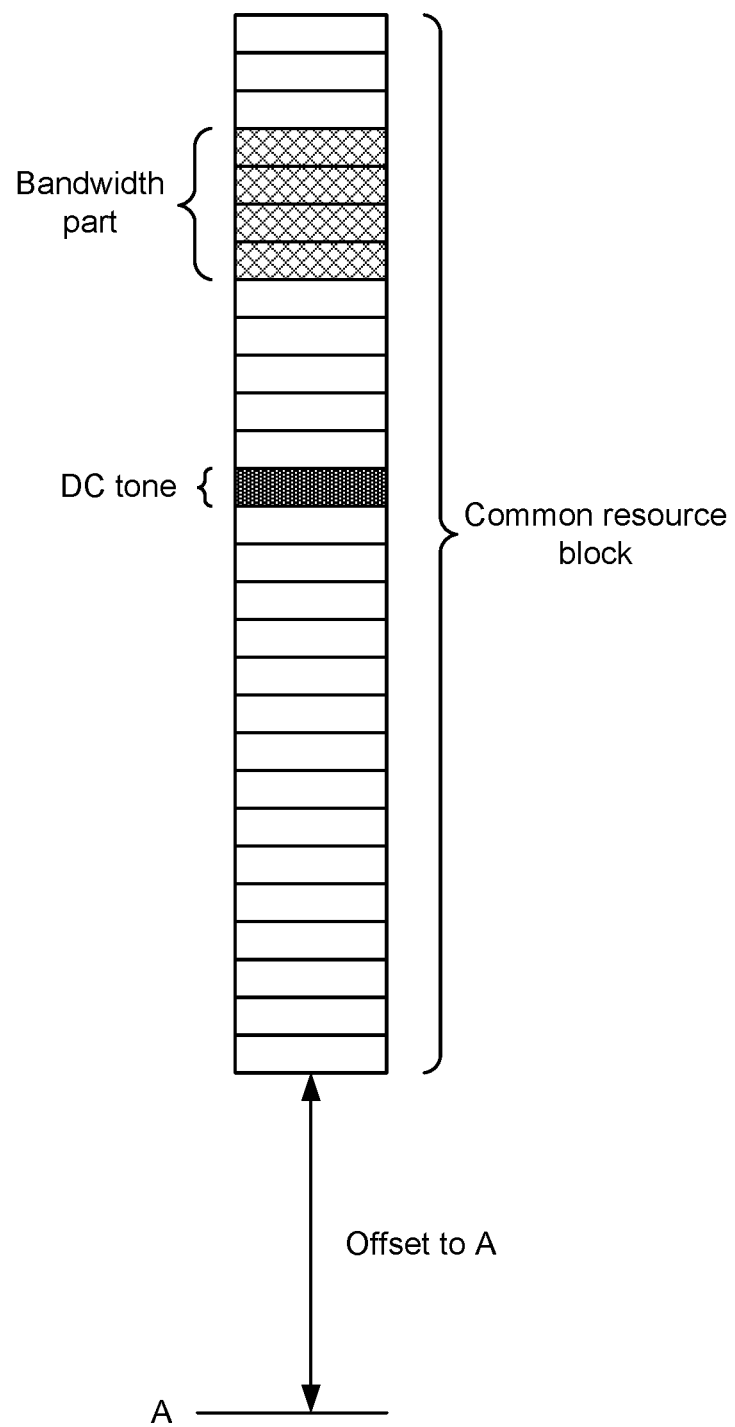
FIG. 8 illustrates an example of a common resource block of a network node, according to various aspects of the disclosure.

However, in technologies such as 5G NR, there is a complicating factor explained with reference to FIG. 8, which illustrates an example of a common resource block of a network node, such as a gNodeB. In the example of FIG.

8, the network node may provide a UE with an offset to a reference point 'A' as the start of its common resource block. Within the common resource block, which may comprise a number of consecutive subcarriers, the network node may transmit its DC tone. The common resource block may be divided into multiple BWPs, with different BWPs used to communicate with different UEs. Note that the design illustrated in FIG. 8 applies to both downlink PRS and uplink PRS (e.g., SRS) defined within one BWP in one frequency layer.

In NR, different numerologies can be associated with different BWPs. This means that subcarrier spacing (SCS) and/or cyclic prefixes (CP) of the BWPs can differ. This implies that notifying the UEs regarding the DC tones of the network nodes can be complicated. The proposed techniques to inform the UEs can enable DC tone signaling that is independent of the BWPs so as to allow elegant and uniform mitigation techniques across frequency layers. In this context, a frequency layer may be related to frequencies or tones allocated or otherwise assigned for transmission of a positioning signal (e.g., PRS). In an aspect, a UE may be configured with one or more frequency layers.

Figure 9:
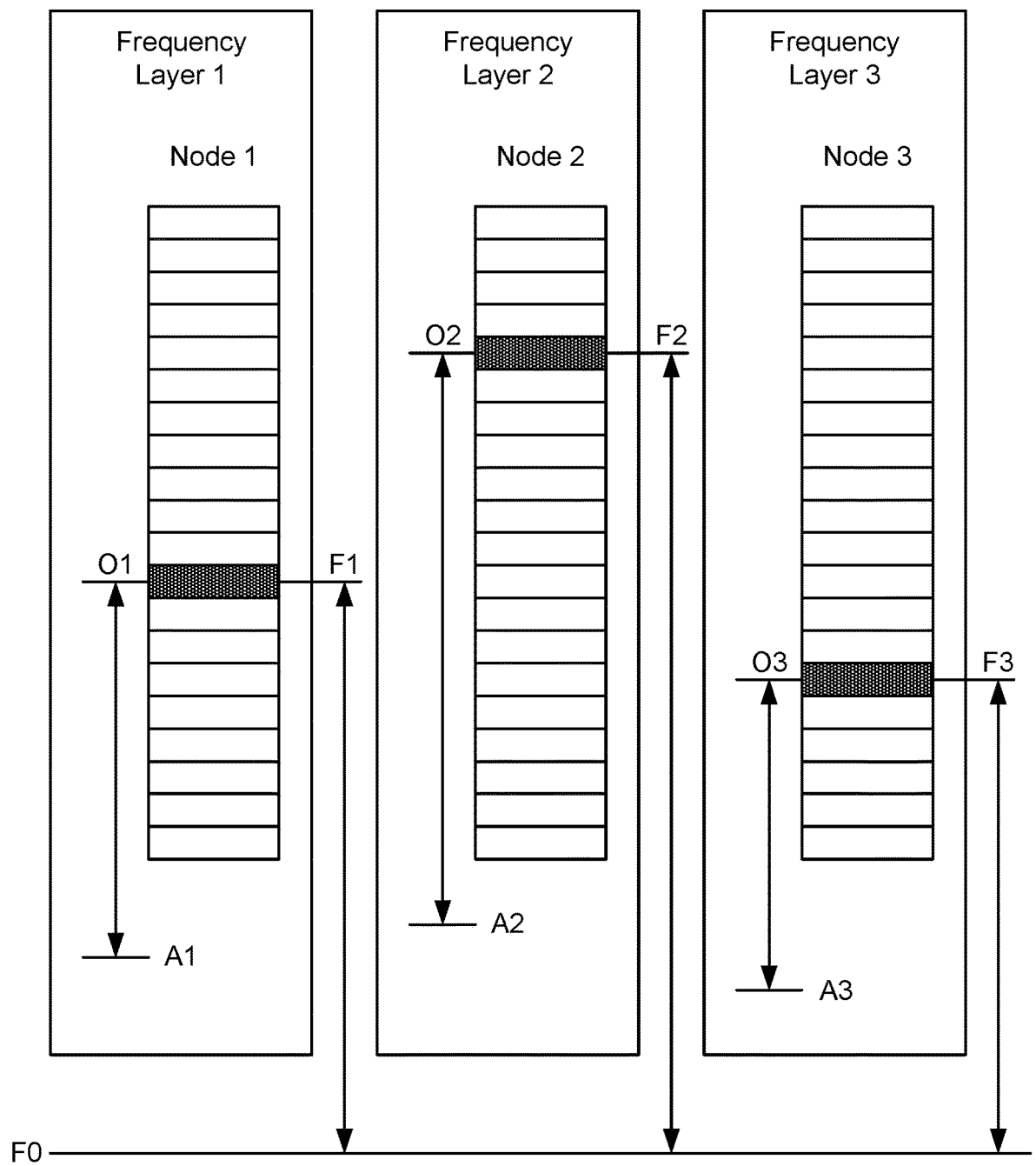
FIGS. 9 and 10 illustrates example scenarios of informing direct current tones of network nodes and/or user equipments, according to various aspects of the disclosure.

FIG. 9 illustrates an example techniques to inform the UE of DC tones of the network nodes by a network entity. The network entity may be a core network element (e.g., a location server, LMF) or one of the network nodes (e.g., serving base station of the UE). In FIG. 9, three network nodes (labeled "Node 1," "Node 2," and "Node 3" (e.g., base stations, gNBs, eNBs, etc.)) are illustrated. Of course, there can be any number of network nodes. Each network node may be configured with one or more frequency layers. In this context, each frequency layer may be associated with a bandwidth of a positioning signal (e.g., PRS bandwidth). In FIG. 9, it is assumed that each of the nodes is configured with one frequency layer. As seen, a common resource block is associated with each of the Nodes 1, 2, and 3. It should be noted that the common resource block of the network nodes need not be the same. For each network node, the darkened subcarrier represents the DC tone of that network node.

The network entity may notify the UE of the DC tones of the network nodes by their absolute frequency bands or some representations of the absolute frequency bands. In FIG. 9, the parameters "F1," "F2," and "F3" represent absolute distances (in frequency) of the DC tones of Nodes 1, 2, and 3, respectively. In this aspect, the network entity may notify the UE of F1, F2, and F3 corresponding to Nodes 1, 2, and 3. For example, F1, F2, and F3 may be channel IDs or absolute radio frequency channel numbers (ARFCNs).

Alternatively, the network entity may notify the UE of the DC tones of the network nodes by two parameters for each DC tone. The first parameter may be a reference frequency point of the frequency layer. In FIG. 9, the parameters "A1," "A2," and "A3" represent the reference frequency points for frequency layers 1, 2, and 3 (of Nodes 1, 2, and 3), respectively. The reference frequency points may identify absolute bands, such as ARFCNs.

The second parameter may be the DC reference offsets, which may indicate the location of the DC tone of the corresponding frequency layer relative to the reference frequency point. In FIG. 9, the parameters "O1," "O2," and "O3" represent the DC reference offsets to the DC tones of Nodes 1, 2, 3, respectively, relative to the reference frequency points A1, A2, A3. The DC reference offset may indicate the location of the DC tone as a number of subcarriers spacing (SCS) offset relative to the reference frequency point.

In an aspect, the numerology of the DC reference offset may be the same as the numerology of the positioning signal corresponding to the frequency layer. For example, assume that the DC tone is 120 kHz above the reference frequency point. If the numerology of the frequency layer is such that the SCS is 30 kHz, then the DC reference offset would be 4. On the other hand, if the numerology of the frequency layer is such that the SCS is 60 kHz, then the DC reference offset would be 2.

Figure 10:
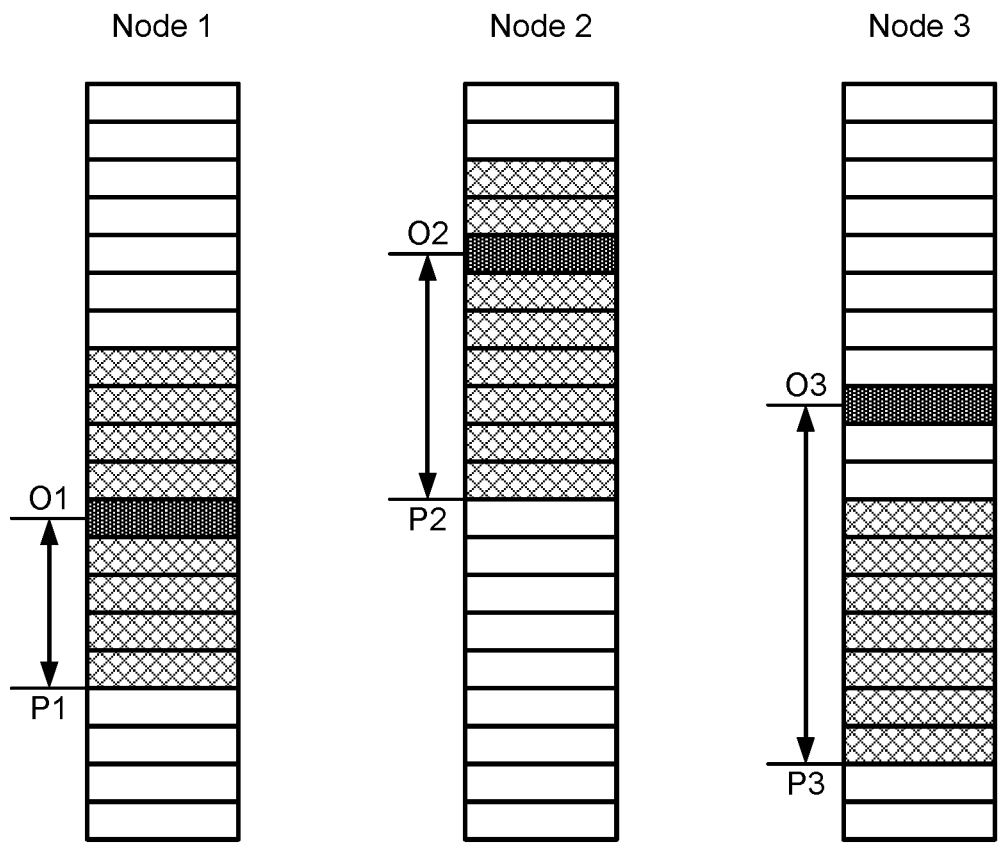

FIG. 10 illustrates another example technique to inform the UE of DC tones of the network nodes by a network entity. In this instance, the DC tone may be specified as an offset from a subcarrier of a positioning signal corresponding to the frequency layer. In FIG. 10, it may be assumed that the cross-hatched tones or subcarriers are the subcarriers of the positioning signal (e.g., PRS). In other words, the resource elements of the positioning signal occupy symbols of the cross-hatched tones. Therefore, the bandwidths of the positioning signals are represented by the number of cross-hatched tones.

In FIG. 10, it may be assumed that the parameter "P1" represents the first tone of the positioning signal transmitted by Node 1. Likewise, it may be assumed that the parameters "P2" and "P3" represent the first tones of the positioning signals transmitted by Nodes 1 and 2, respectively. Then DC tone offsets labeled "O1," "O2," and "O3" may respectively represent offsets from "P1," "P2," and "P3." In this instance, the DC tones of Nodes 1 and 2 are shown to coincide with tones of the positioning signals transmitted from these nodes. In other words, some resource elements of the positioning signals of Nodes 1 and 2 are transmitted on the DC tones of these nodes. On the other hand, none of the resource elements of the positioning signal transmitted from Node 3 coincide with the DC tone of Node 3.

The DC positioning offset may indicate the location of the DC tone as a number of subcarriers spacing (SCS) offset relative to a subcarrier of the of the positioning signal. In FIG. 10, the first tones of the positioning signals are used as the reference points. However, any subcarrier may be used (e.g., last subcarrier, middle subcarrier, etc.). In an aspect, the numerology of the DC positioning offset may be the same as the numerology of the positioning signal corresponding to the frequency layer. In other words, P1, P2, P3 can be in any position, e.g., first, middle, last, etc.

Information elements (IEs) may be defined to enable the UE to be notified of the DC tones of the plurality of network nodes. In one aspect, network nodes (e.g., gNBs) may be contained within a frequency layer. FIG. 11 illustrates an IE structure 1100 in which the gNB IEs are contained within the frequency layer IEs, as indicated by the gNB identifiers (e.g., "gNB 1," "gNB 2," "gNB 3") of the gNB sets being indented under the frequency layer sets. The IE structure 1100 also includes various attributes of a frequency layer and a gNB, such as reference point and periodicity for the frequency layers and offset, bandwidth, offset to reference point (of the corresponding frequency layer), and PRS patterns for the gNBs. In another aspect, frequency layers may be contained within network nodes. FIG. 12 illustrates an IE structure 1200 in which the frequency layer IEs are contained within the gNB IEs, as indicated by the parameters of the gNBs (e.g., "gNB 1," "gNB 2," "gNB 3") including a frequency layer set parameter. As shown, the frequency layer set parameters are also defined in the IE structure 1200. As will be appreciated, these are merely examples, and other IE structures are possible.

In an aspect, existing positioning messages can be used to convey the IEs illustrated in FIGS. 11 and 12. For example, the OTDOA-PorvideAssistanceData message includes elements OTDOA-ReferenceCellInfo and OTDOA-NeighbourCellInfo. In an aspect, these elements may be augmented or otherwise modified to incorporate the IEs illustrated in FIGS. 11 and 12.

Figure 13:
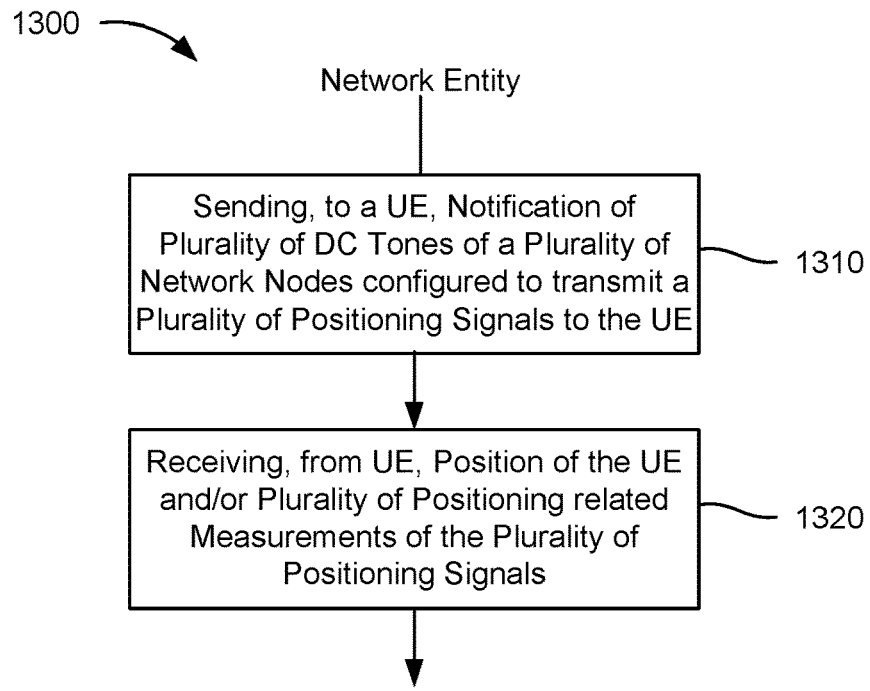
FIGS. 13 to 17 illustrate example flow charts of methods and/or processes of informing a user equipment of direct current tones of a plurality of network nodes, according to various aspects of the disclosure.
Figure 14:
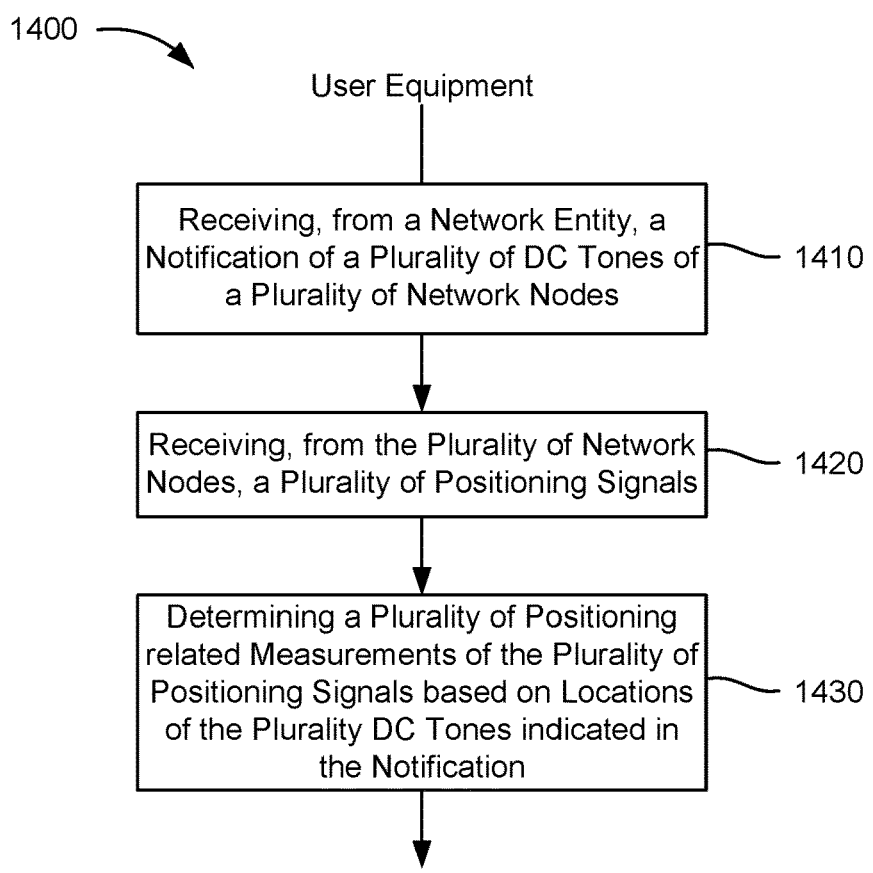

FIGS. 13 and 14 illustrate example methods to inform a UE of DC tones of a plurality of network nodes, i.e., inform the UE of downlink DC tones. In particular, FIG. 13 illustrates a flow chart of an example method 1300 performed by a network entity such as a network node (e.g., serving base station) or a core network component (e.g., location server, LMF, etc.). FIG. 14 illustrates a flow chart of an example method 1400 perform by a UE.

In block 1310, the network entity may send, to the UE, a notification of a plurality of DC tones of a plurality of network nodes. The plurality of network nodes may be configured to transmit a plurality of positioning signals to the UE. The plurality of network nodes may include a serving network node serving the UE, and one or more neighboring network nodes of the serving network node. Each positioning signal may be a PRS, a CSI-RS, a DMRS, a PSS, an SSS, or a PTRS.

In an aspect, for at least one network node of the plurality of network nodes, the notification may include a channel ID of the DC tone of the at least one network node. The channel ID may be an absolute channel ID such as an ARFCN (e.g., see FIG. 9).

Recall that each network node of the plurality of network nodes may be configured with one or more frequency layers corresponding to one or more positioning signals configured to be transmitted from that network node. Also, each frequency layer may be associated with a bandwidth of the corresponding positioning signal.

Then in another aspect, for at least one frequency layer of at least one network node, the notification may include a reference frequency point of the at least one frequency layer and a DC reference offset. The reference frequency point may be an absolute frequency point, such as an ARFCN. The DC reference offset may indicate a location of the DC tone relative to the reference frequency point. For example, the DC reference offset may indicate the location of the DC tone as a number of subcarriers spacing (SCS) offset relative to the reference frequency point. Also, the numerology of the DC reference offset may be the same as the numerology of the positioning signal corresponding to the at least one frequency layer (e.g., also see FIG. 9).

In yet another aspect, when the network nodes are configured with frequency layers as indicated immediately above, for at least one frequency layer of at least one network node, the notification may include a DC positioning offset of the at least one frequency layer. The DC positioning offset may indicate a location of the DC tone relative a subcarrier of the positioning signal (e.g., PRS) corresponding to the at least one frequency layer. For example, the DC positioning offset may indicate the location of the DC tone as a number SCS offsets relative to the subcarrier of the positioning signal corresponding to the at least one frequency layer. Here, the numerology of the DC positioning offset may be the same as the numerology of the positioning signal corresponding to the at least one frequency layer (e.g., see FIG. 10).

In an aspect, where the network entity is a base station, block 1310 may be performed by WWAN transceiver 350, processing system 384, memory component 386, and/or positioning component 388, any or all of which may be considered means for performing this operation. Where the network entity is a core network entity, block 1310 may be performed by network interface(s) 390, processing system 394, memory component 396, and/or positioning component 398, any or all of which may be considered means for performing this operation.

In block 1320, the network entity may receive a position of the UE from the UE. Alternatively or in addition thereto, the network entity may receive a plurality of positioning related measurements of the plurality of positioning signals at the UE. Examples of positioning related measurements include ToA, RSTDs, AoAs, RSRPs, Rx-Tx measurements, etc.

In an aspect, where the network entity is a base station, block 1320 may be performed by WWAN transceiver 350, processing system 384, memory component 386, and/or positioning component 388, any or all of which may be considered means for performing this operation. Where the network entity is a core network entity, block 1320 may be performed by network interface(s) 390, processing system 394, memory component 396, and/or positioning component 398, any or all of which may be considered means for performing this operation Regarding FIG. 14, in block 1410, the UE may receive, from the network entity, a notification of the plurality of DC tones of a plurality of network nodes. In an aspect, block 1410 may be performed by WWAN transceiver 310, processing system 332, memory component 340, and/or positioning component 342, any or all of which may be considered means for performing this operation.

In block 1420, the UE may receive a plurality of positioning signals (e.g., PRSs) from the plurality of network nodes. In an aspect, block 1420 may be performed by WWAN transceiver 310, processing system 332, memory component 340, and/or positioning component 342, any or all of which may be considered means for performing this operation.

In block 1430, the UE may determine a plurality of positioning related measurements of the plurality of positioning signals based on locations of the plurality of DC tones indicated in the notification. In an aspect, block 1430 may be performed by WWAN transceiver 310, processing system 332, memory component 340, and/or positioning component 342, any or all of which may be considered means for performing this operation.

Figure 15:
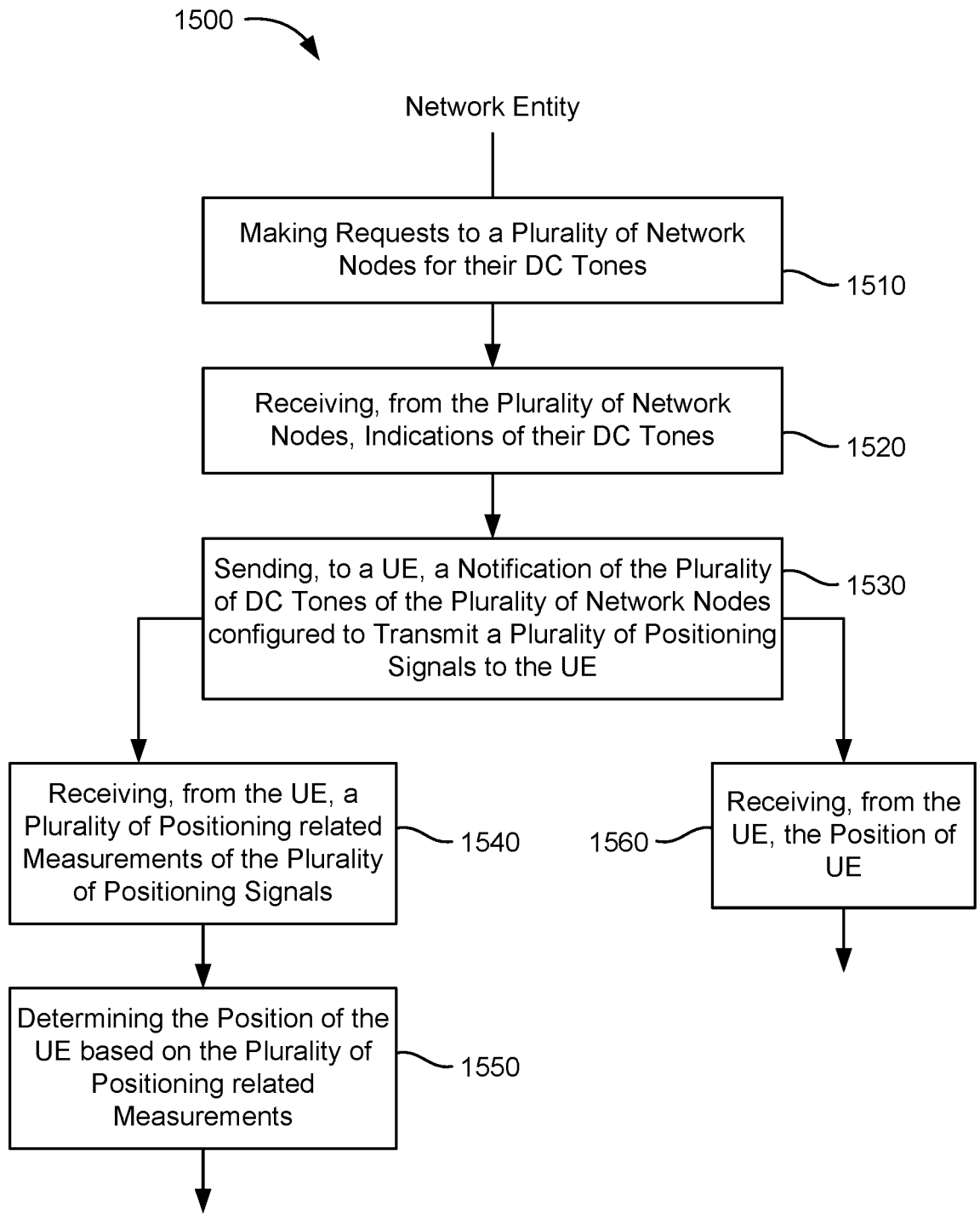

FIG. 15 illustrates a flow chart of a method 1500, which is an example implementation of method 1300 for informing the UE of the DC tones of multiple network nodes. Thus, method 1500 may be performed by a network entity (network node (e.g., base station), core network component (e.g., location server, LMF, etc.)).

In block 1510, the network entity may make requests to the plurality of network nodes of their DC tones. If the network entity is a location server, then the location server may exchange NRPPa or LPPa messages with the plurality of network nodes to make the request. If the network entity is the serving network node, then the serving network node may exchanges messages with the neighboring network nodes through interfaces such as Xn and/or X2 interfaces to make the request.

In an aspect, where the network entity is a base station, block 1510 may be performed by WWAN transceiver 350, processing system 384, memory component 386, and/or positioning component 388, any or all of which may be considered means for performing this operation. Where the network entity is a core network entity, block 1510 may be performed by network interface(s) 390, processing system 394, memory component 396, and/or positioning component 398, any or all of which may be considered means for performing this operation.

In block 1520, the network entity may receive, from the plurality of network nodes, indications of their DC tones. If the network entity is a location server, then the location server may exchange NRPPa or LPPa messages with the plurality of network nodes to receive the indications. If the network entity is the serving network node, then the serving network node may exchanges messages with the neighboring network nodes through Xn and/or X2 interfaces to receive the indications.

In an aspect, where the network entity is a base station, block 1520 may be performed by WWAN transceiver 350, processing system 384, memory component 386, and/or positioning component 388, any or all of which may be considered means for performing this operation. Where the network entity is a core network entity, block 1520 may be performed by network interface(s) 390, processing system 394, memory component 396, and/or positioning component 398, any or all of which may be considered means for performing this operation.

Note that some or all of the plurality of network nodes may provide their DC tones on their own initiative. This implies that for those network nodes that provide the DC tones without requests from the network entity, block 1510 need not be performed.

In block 1530, the network entity may send, to the UE, a notification of a plurality of DC tones of a plurality of network nodes. Block 1530 may be similar to block 1310 of FIG. 13. That is, the description of block 1310 also applies to block 1530.

When the network entity is a core network component such as the location server, the notification provided to the UE may be in the form of assistance data that includes the DC tone of the serving network node and the DC tones of the neighboring network nodes configured to transmit positioning signals to the UE. In this instance, the network entity may exchange LPP messages to provide the assistance data to the UE.

When the network entity is the serving network node, the notification provided to the UE may also be in the form of assistance data that includes the DC tones of the neighboring network nodes. However, the assistance data may or may not include the DC tone of the serving network node itself. This is because the serving network node may have the option of informing the UE of its DC tone separately, e.g., through a SIB message.

The assistance data, whether or not the DC tone of the serving network node is included, may be provided in a configuration message. The configuration message may be an LPP message. Alternatively or in addition thereto, the configuration message may be an RRC message.

In an aspect, where the network entity is a base station, block 1530 may be performed by WWAN transceiver 350, processing system 384, memory component 386, and/or positioning component 388, any or all of which may be considered means for performing this operation. Where the network entity is a core network entity, block 1530 may be performed by network interface(s) 390, processing system 394, memory component 396, and/or positioning component 398, any or all of which may be considered means for performing this operation.

In block 1540, the network entity may receive a plurality of positioning related measurements of the plurality of positioning signals at the UE. If the network entity is the location server, LPP messages may be exchanged. If the network entity is the serving network node, positioning protocol messages may be exchanged. Alternatively or in addition thereto, shared and/or control channel messages (e.g., physical uplink shared channel (PUSCH), physical uplink control channel (PUCCH), PDSCH, PDCCH) may be exchanged.

In an aspect, where the network entity is a base station, block 1540 may be performed by WWAN transceiver 350, processing system 384, memory component 386, and/or positioning component 388, any or all of which may be considered means for performing this operation. Where the network entity is a core network entity, block 1540 may be performed by network interface(s) 390, processing system 394, memory component 396, and/or positioning component 398, any or all of which may be considered means for performing this operation.

In block 1550, the network entity may determine the position of the UE from the plurality of positioning related measurements. In an aspect, where the network entity is a base station, block 1550 may be performed by WWAN transceiver 350, processing system 384, memory component 386, and/or positioning component 388, any or all of which may be considered means for performing this operation. Where the network entity is a core network entity, block 1550 may be performed by network interface(s) 390, processing system 394, memory component 396, and/or positioning component 398, any or all of which may be considered means for performing this operation.

In block 1560, the network entity may receive the position of the UE from the UE. If the network entity is the location server, LPP messages may be exchanged. If the network entity is the serving network node, positioning protocol and/or shared/control channel messages may be exchanged.

In an aspect, where the network entity is a base station, block 1560 may be performed by WWAN transceiver 350, processing system 384, memory component 386, and/or positioning component 388, any or all of which may be considered means for performing this operation. Where the network entity is a core network entity, block 1560 may be performed by network interface(s) 390, processing system 394, memory component 396, and/or positioning component 398, any or all of which may be considered means for performing this operation.

Figure 16:
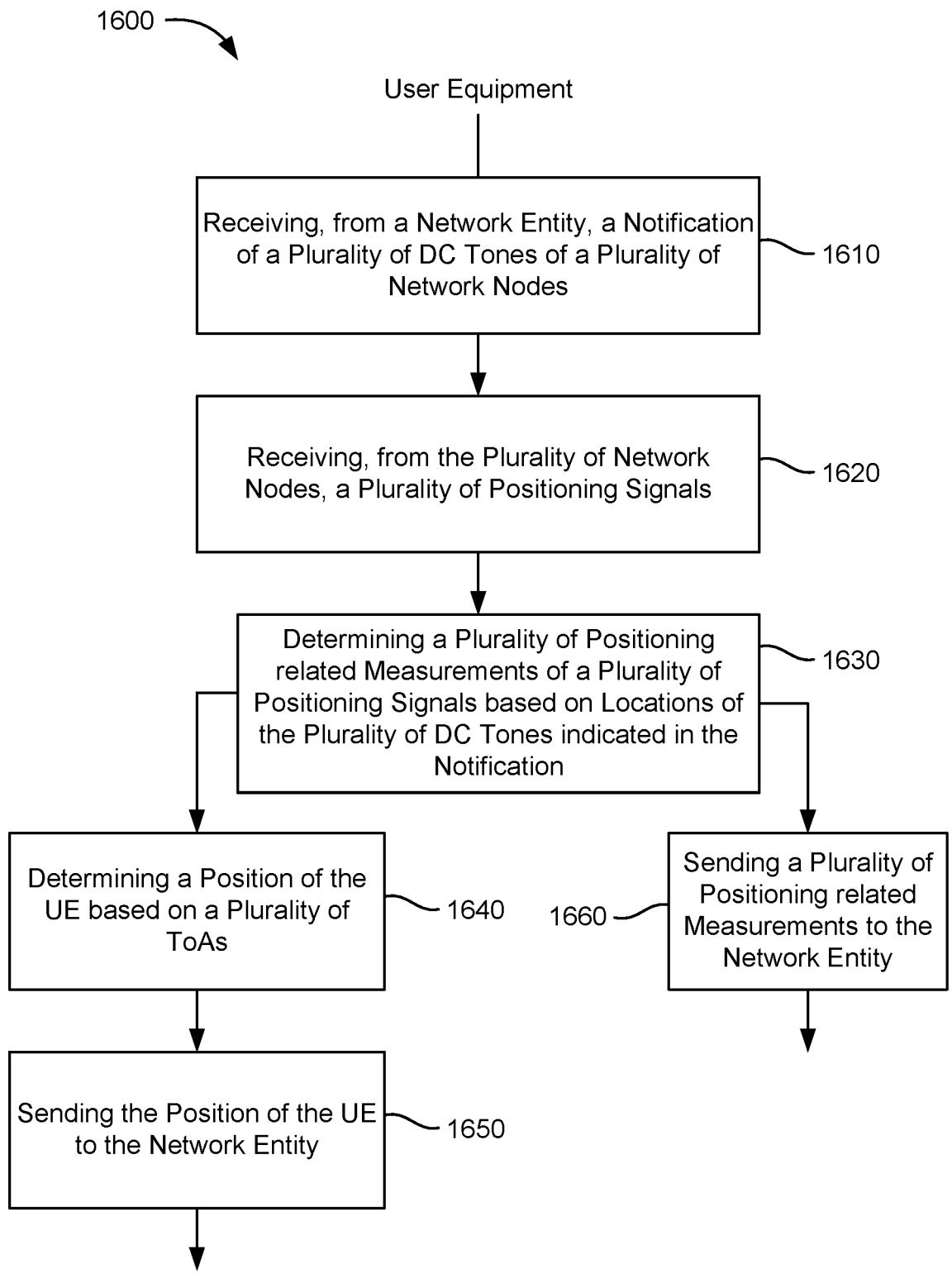

FIG. 16 illustrates a flow chart of a method 1600, which is an example implementation of method 1400 for being notified of the DC tones of multiple network nodes. Thus, method 1600 may be performed by a UE.

In block 1610, the UE may receive, from the network entity, a notification of the plurality of DC tones of the plurality of network nodes. In an aspect, block 1610 may be performed by WWAN transceiver 310, processing system 332, memory component 340, and/or positioning component 342, any or all of which may be considered means for performing this operation.

In block 1620, the UE may receive the plurality of positioning signals (e.g., PRSs) from the plurality of network nodes. In an aspect, block 1620 may be performed by WWAN transceiver 310, processing system 332, memory component 340, and/or positioning component 342, any or all of which may be considered means for performing this operation.

In block 1630, the UE may determine a plurality of positioning related measurements of the plurality of positioning signals based on locations of the plurality of DC tones indicated in the notification. In an aspect, block 1630 may be performed by WWAN transceiver 310, processing system 332, memory component 340, and/or positioning component 342, any or all of which may be considered means for performing this operation.

Figure 17:
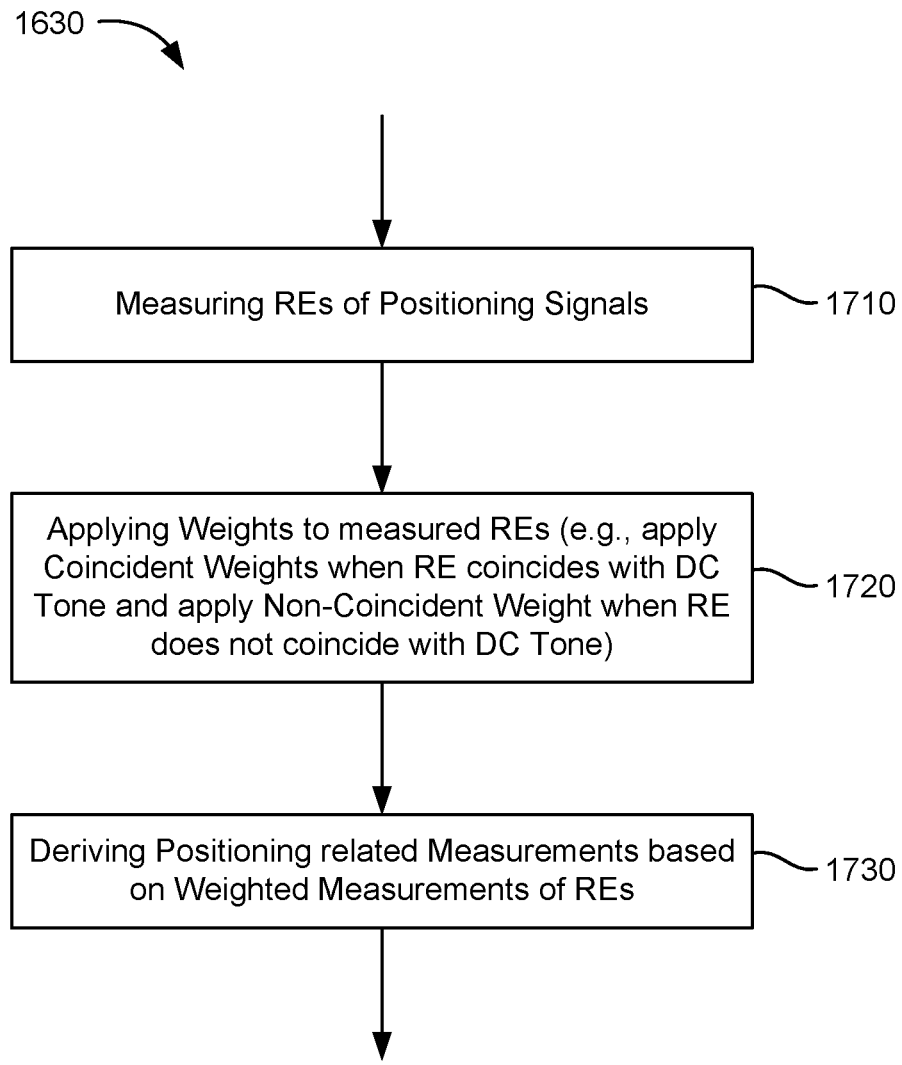

FIG. 17 illustrates a flow chart of an example process to implement block 1630. In block 1710, the UE may measure the resource elements of a positioning signal transmitted from a network node. In an aspect, block 1710 may be performed by WWAN transceiver 310, processing system 332, memory component 340, and/or positioning component 342, any or all of which may be considered means for performing this operation.

In block 1720, the UE may apply weights to the measured REs. In particular, for any REs that are coincident with the DC tones, weights may be applied so as to deemphasize their contributions. Thus, in an aspect, a measured RE may be applied a "coincident" weight or a "non-coincident" weight. As the names imply, for an RE, a coincident weight is applied when the RE is coincident with the DC tone, and a non-coincident weight is applied when the RE is not coincident with the DC tone.

When the coincident weight applied to the RE, the contribution the RE makes in deriving the positioning related measurement of the positioning signal may be less than when the non-coincident weight is applied. In some instances, the coincident weight may be such that the RE is ignored all together, i.e., the RE makes no contribution.

The following should be noted. First, the coincident/non-coincident weights applied to different REs need not be the same, although they can be. In other words, coincident/non-coincident weights applied to one RE may be independent of the coincident/non-coincident weights applied to another RE. Second, the DC tones of the network nodes need not be the same. Thus, whether an RE is coincident with a DC tone should be determined with the DC tone of the positioning signal (e.g., of the frequency layer) corresponding to the network node that transmits the positioning signal.

This implies that the UE should determine the DC tone based on the notification. For example, if the notification includes the channel ID, then the channel ID may be taken as the DC tone. If the notification includes a reference frequency point and a DC reference offset, then the UE may calculate or otherwise determine the DC tone based on these parameters. If the notification includes the DC positioning offset, then the UE may calculate or otherwise determine the DC tone based on the DC positioning offset and a subcarrier of the positioning signal.

In an aspect, block 1720 may be performed by WWAN transceiver 310, processing system 332, memory component 340, and/or positioning component 342, any or all of which may be considered means for performing this operation.

In block 1730, the UE may derive the positioning related measurements of the positioning signals based on the weighted measurements of the REs. In an aspect, block 1730 may be performed by WWAN transceiver 310, processing system 332, memory component 340, and/or positioning component 342, any or all of which may be considered means for performing this operation.

Referring back to FIG. 16, block 1640, the UE may determine the position of the UE. In an aspect, block 1640 may be performed by WWAN transceiver 310, processing system 332, memory component 340, and/or positioning component 342, any or all of which may be considered means for performing this operation.

In block 1650, the UE may send the position of the UE to the network entity. If the network entity is the location server, LPP messages may be exchanged. If the network entity is the serving network node, positioning protocol and/or shared/control channel messages may be exchanged.

In an aspect, block 1650 may be performed by WWAN transceiver 310, processing system 332, memory component 340, and/or positioning component 342, any or all of which may be considered means for performing this operation.

In block 1660, the UE may send the plurality of positioning related measurements to the network entity. If the network entity is the location server, LPP messages may be exchanged. If the network entity is the serving network node, positioning protocol and/or shared/control channel messages may be exchanged. In an aspect, block 1660 may be performed by WWAN transceiver 310, processing system 332, memory component 340, and/or positioning component 342, any or all of which may be considered means for performing this operation.

Figure 18:
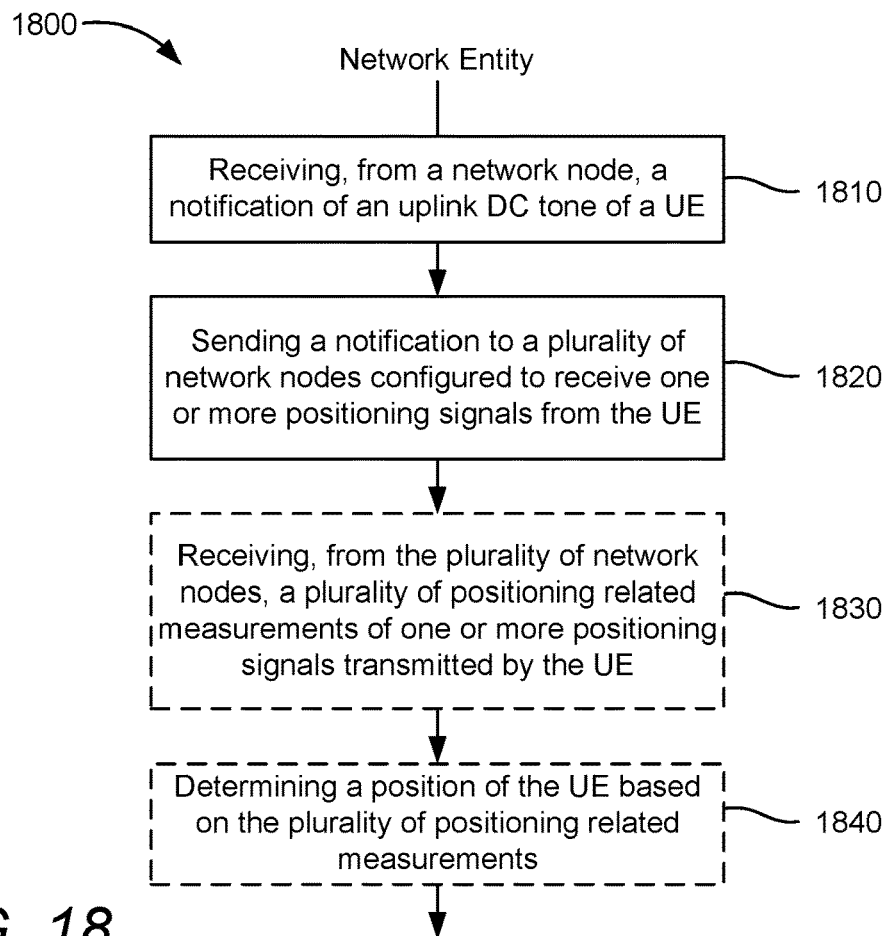
FIGS. 18 to 20 illustrate example flow charts of methods and/or processes of informing a plurality of network nodes of a direct current tone of a user equipment, according to various aspects of the disclosure.
Figure 19:
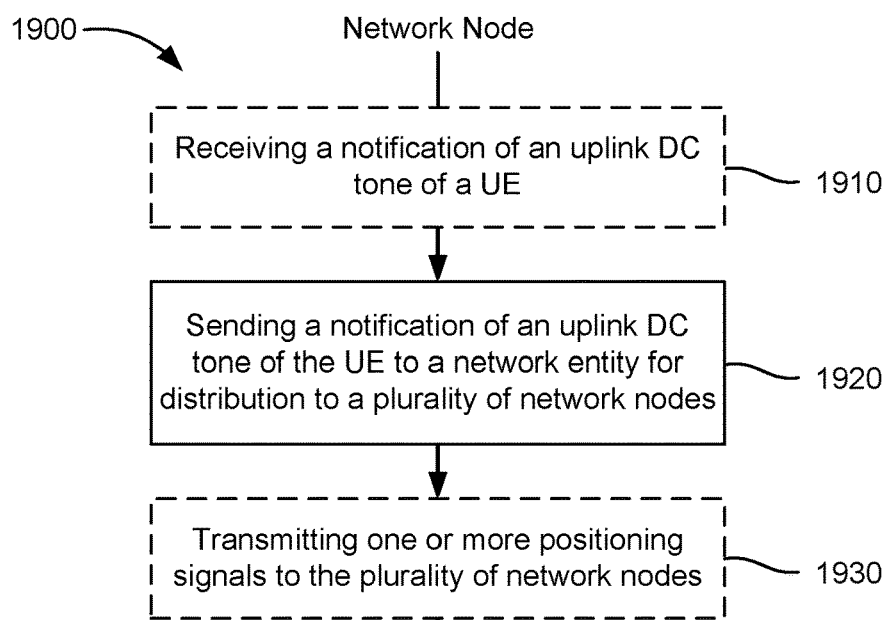

FIGS. 18 and 19 illustrate example methods to inform multiple network nodes of the DC tone of the UE, i.e., inform the network of uplink DC tones. In particular, FIG. 18 illustrates a flow chart of an example method 1800 performed by a network entity, and FIG. 19 illustrates a flow chart of an example method 1900 perform by a network node (e.g., a UE or a base station).

Regarding FIG. 18, in block 1810, the network entity may receive, from a network node (e.g., a UE being positioned or a base station serving the UE being positioned), a notification of the uplink DC tone of the UE for UL-PRS. If the network entity is a location server and the network node is a UE, LPP messages may be exchanged. If the network entity is a location server and the network node is a base station serving the UE, NRPPa messages may be exchanged. If the network entity is a serving network node (e.g., serving base station) and the network node is a UE, positioning protocol messages and/or shared/control channel messages or RRC messages may be exchanged. In an aspect, where the network entity is a base station, block 1810 may be performed by WWAN transceiver 350, processing system 384, memory component 386, and/or positioning component 388, any or all of which may be considered means for performing this operation. Where the network entity is a core network entity, block 1810 may be performed by network interface(s) 390, processing system 394, memory component 396, and/or positioning component 398, any or all of which may be considered means for performing this operation.

In block 1820, the network entity may send the notification of the UE's uplink DC tone to a plurality of network nodes, which may be configured to receive one or more positioning signals from the UE. If the network entity is a location server, NRPPa or LPPa messages may be exchanged. If the network entity is a serving network node, messages may be exchanged through Xn and/or X2 interfaces.

The plurality of network nodes may include the serving network node serving the UE and one or more neighboring network nodes of the serving network node. Each positioning signal may be an SRS, a DMRS, or a PTRS.

The notification may include a channel ID of the DC tone of the at least one network node. The channel ID may be an absolute channel ID, such as ARFCN (see FIG. 9). Alternatively, the notification may include, for at least one frequency layer of the UE (the UE may also be configured with one or more frequency layers), a reference frequency point of the at least one frequency layer and a DC reference offset (also see FIG. 9). In another alternative, the notification may include a DC positioning offset (see FIG. 10).

In an aspect, where the network entity is a base station, block 1820 may be performed by WWAN transceiver 350, processing system 384, memory component 386, and/or positioning component 388, any or all of which may be considered means for performing this operation. Where the network entity is a core network entity, block 1820 may be performed by network interface(s) 390, processing system 394, memory component 396, and/or positioning component 398, any or all of which may be considered means for performing this operation.

In block 1830, the network entity may receive a plurality of positioning related measurements from the plurality of network nodes. The received positioning related measurements may be the positioning related measurements at each of the network nodes of the one or more positioning signals transmitted by the UE. If the network entity is a location server, NRPPa or LPPa messages may be exchanged. If the network entity is a serving network node, messages may be exchanged through Xn and/or X2 interfaces.

In an aspect, where the network entity is a base station, block 1830 may be performed by WWAN transceiver 350, processing system 384, memory component 386, and/or positioning component 388, any or all of which may be considered means for performing this operation. Where the network entity is a core network entity, block 1830 may be performed by network interface(s) 390, processing system 394, memory component 396, and/or positioning component 398, any or all of which may be considered means for performing this operation.

In block 1840, the network entity may determine the position of the UE based on the plurality of positioning related measurements. In an aspect, where the network entity is a base station, block 1840 may be performed by WWAN transceiver 350, processing system 384, memory component 386, and/or positioning component 388, any or all of which may be considered means for performing this operation. Where the network entity is a core network entity, block 1840 may be performed by network interface(s) 390, processing system 394, memory component 396, and/or positioning component 398, any or all of which may be considered means for performing this operation.

Blocks 1830 and 1840 are optional because, if the network entity is the UE's serving network node (e.g., serving base station), the location server or the UE, not the serving network node, may receive the positioning related measurements and determine the UE's position. However, in some cases, the serving network node may perform blocks 1830 and 1840.

Regarding FIG. 19, in optional block 1910, the network node may receive a notification of the uplink DC tone of a UE. The uplink DC tone may be for UL-PRS transmitted by the UE. Block 1910 is optional because it is performed when the network node is a base station. The network node may receive the notification from the UE via RRC signaling, for example. In an aspect, block 1910 may be performed by WWAN transceiver 350, processing system 384, memory component 386, and/or positioning component 388, any or all of which may be considered means for performing this operation.

In block 1920, the network node may send a notification of the uplink DC tone of the UE to the network entity. The notification may be sent for distribution to the plurality of network nodes configured to receive one or more positioning signals transmitted by the UE. If the network node is a UE and the network entity is a location server, LPP messages may be exchanged. If the network node is a base station serving the UE and the network entity is a location server, NRPPa messages may be exchanged. If the network node is the UE and the network entity is a serving network node (e.g., serving base station), positioning protocol (LPP, etc.) messages and/or shared/control channel messages or RRC messages may be exchanged. In an aspect, where the network node is a UE, block 1920 may be performed by WWAN transceiver 310, processing system 332, memory component 340, and/or positioning component 342, any or all of which may be considered means for performing this operation. Where the network node is a base station, block 1920 may be performed by WWAN transceiver 350, processing system 384, memory component 386, and/or positioning component 388, any or all of which may be considered means for performing this operation.

In optional block 1930, the network node may transmit the one or more positioning signals to the plurality of network nodes. Block 1930 is optional because it is performed when the network node is a UE. In an aspect, block 1920 may be performed by WWAN transceiver 310, processing system 332, memory component 340, and/or positioning component 342, any or all of which may be considered means for performing this operation.

Figure 20:
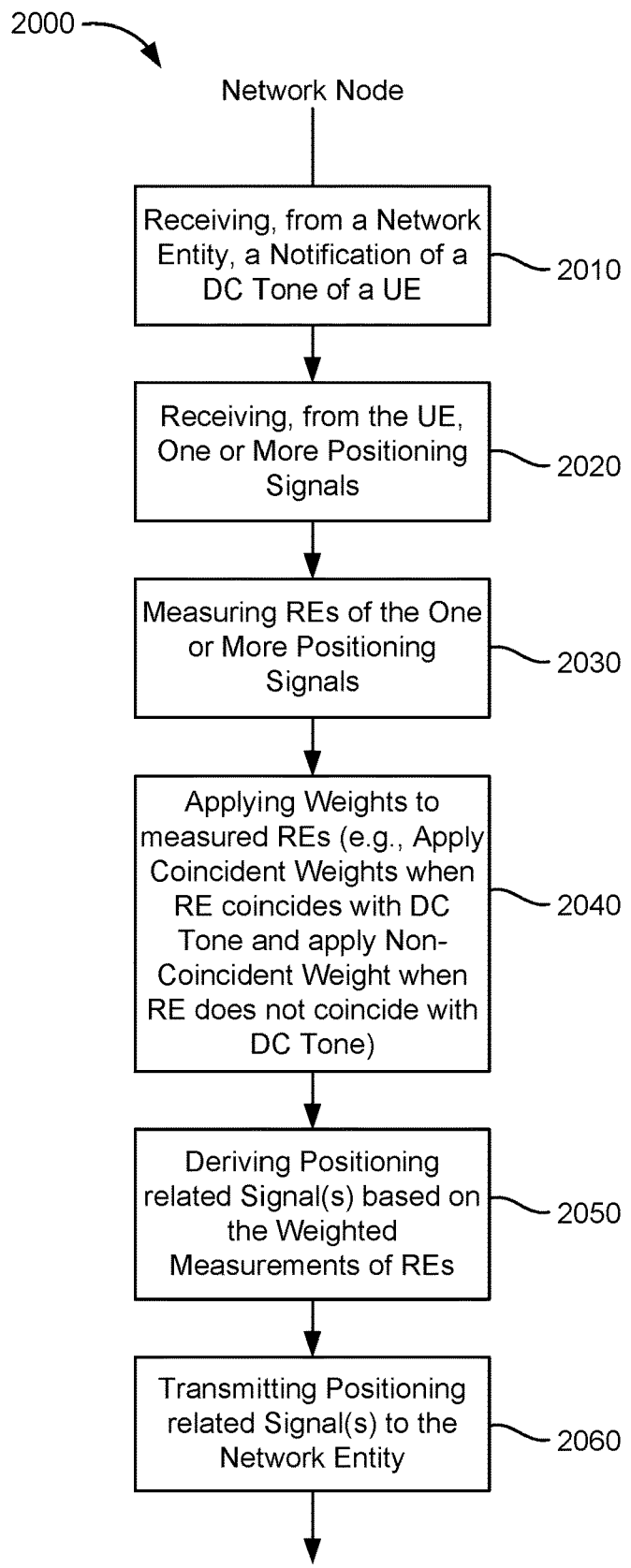

FIG. 20 illustrates a flow chart of a method 2000, which is an example implementation of method 1900 for being notified of the DC tones of the UE. Method 2000 may be performed by a network node, e.g., one of the plurality of network nodes.

In block 2010, the network node may receive, from the network entity, a notification of the DC tone of the UE. If the network entity is the location server, NRPPa or LPPa messages may be exchanged. If the network entity is the serving network node, positioning protocol and/or shared/control channel messages may be exchanged. In an aspect, block 2010 may be performed by WWAN transceiver 350, processing system 384, memory component 386, and/or positioning component 388, any or all of which may be considered means for performing this operation.

In block 2020, the network node may receive one or more positioning signals (e.g., SRS) from the UE. If the network entity is the location server, NRPPa and LPPa messages may be exchanged. If the network entity is the serving network node, positioning protocol and/or shared/control channel messages may be exchanged. In an aspect, block 2020 may be performed by WWAN transceiver 350, processing system 384, memory component 386, and/or positioning component 388, any or all of which may be considered means for performing this operation.

In block 2030, the network node may measure the resource elements of a positioning signal transmitted from the UE. In an aspect, block 2030 may be performed by WWAN transceiver 350, processing system 384, memory component 386, and/or positioning component 388, any or all of which may be considered means for performing this operation.

In block 2040, the network node may apply weights to the measured REs. Block 2040 may be similar to block 1720. For example, if an RE is coincident with the DC tone of the UE, the network may apply a coincident weight to the RE so as to deemphasize its contribution towards determining the positioning related measurement of the positioning signal. Otherwise, a non-coincident weight may be applied. In an aspect, block 2040 may be performed by WWAN transceiver 350, processing system 384, memory component 386, and/or positioning component 388, any or all of which may be considered means for performing this operation.

In block 2050, the network node may derive the positioning related measurements of the one or more positioning signal based on the weighted measurements of the REs. In an aspect, block 2050 may be performed by WWAN transceiver 350, processing system 384, memory component 386, and/or positioning component 388, any or all of which may be considered means for performing this operation.

In block 2060, the network node may send the positioning related measurement(s) to the network entity. If the network entity is the location server, NRPPa or LPPa messages may be exchanged. If the network entity is the serving network node, positioning protocol and/or shared/control channel messages may be exchanged. In an aspect, block 2060 may be performed by WWAN transceiver 350, processing system 384, memory component 386, and/or positioning component 388, any or all of which may be considered means for performing this operation.

As will be appreciated, a technical advantage of the foregoing methods and techniques is that by notifying a UE (for downlink communication) or the network nodes (for uplink communication) of DC tones, when signals are received on the DC tones, appropriate compensating actions may be taken.

The following are additional examples of aspects disclosed herein.

Example 1: A method of a network entity, the method comprising: sending, to a UE, a notification of a plurality of DC tones of a plurality of network nodes configured to transmit a plurality of positioning signals to the UE; and receiving, from the UE, a position of the UE, and/or a plurality of positioning related measurements of the plurality of positioning signals.

Example 2: The method of Example 1, wherein the positioning signals are downlink reference signals, each downlink reference signal being a PRS, a CSI-RS, a DMRS, a PSS, an SSS, or a PTRS.

Example 3: The method of claim 23, wherein the plurality of network nodes includes: a serving network node serving the UE; and one or more neighboring network nodes of the serving network node.

Example 4: The method of Example 3, wherein the network entity is a location server, and wherein the method further comprises: receiving, from the plurality of network nodes, indications of their DC tones prior to sending the notification.

Example 5: The method of Example 4, further comprising: making requests to the plurality of network nodes of their DC tones prior to receiving the plurality of indications.

Example 6: The method of Example 5, wherein the network entity exchanges one or more positioning protocol A messages with the plurality of network nodes to receive the plurality of DC tones and/or make requests for the plurality of DC tones, the positioning protocol A messages comprising NRPPa and/or LPPa messages.

Example 7: The method of Example 4, wherein sending the notification comprises providing assistance data to the UE, the assistance data comprising: the DC tone of the serving network node, and the DC tones of the one or more neighboring network nodes.

Example 8: The method of Example 7, wherein the network entity exchanges one or more positioning protocol messages with the UE to provide the assistance data to the UE, the positioning protocol messages comprising LPP messages.

Example 9: The method of Example 3, wherein the network entity is the serving network node, and wherein the method further comprises: receiving, from the one or more neighboring network nodes, indications of their DC tones prior to sending the notification.

Example 10: The method of Example 9, further comprising: making requests to the one or more neighboring network nodes of their DC tones prior to receiving the plurality of indications.

Example 11: The method of Example 10, wherein the network entity receives and/or makes the requests for the DC tones through one or more interfaces to the one or more neighboring network nodes, the one or more interfaces comprising Xn and/or X2 interfaces.

Example 12: The method of Example 9, wherein sending the notification comprises providing assistance data to the UE, the assistance data comprising the DC tones of the one or more neighboring network nodes.

Example 13: The method of Example 12, wherein the assistance data further comprises the DC tone of the serving network node.

Example 14: The method of Example 12, wherein the network entity exchanges one or more configuration messages and/or one or more positioning protocol messages with the UE to provide the assistance data to the UE.

Example 15: The method of Example 14, wherein the configuration messages are RRC messages, and/or wherein the positioning protocol messages are LPP messages.

Example 16: The method of Example 12, further comprising: sending a SIB message to the UE, the SIB message including the DC tone or the network entity.

Example 17: The method of Example 1, wherein for at least one network node of the plurality of network nodes, the notification includes a channel ID of the DC tone of the at least one network node, the channel ID being an absolute channel ID.

Example 18: The method of Example 1, wherein each network node of the plurality of network nodes is configured with one or more frequency layers corresponding to one or more positioning signals configured to be transmitted from that network node, each frequency layer being associated with a bandwidth of the corresponding positioning signal, and wherein, for at least one frequency layer of at least one network node, the notification includes: a reference frequency point of the at least one frequency layer, the reference frequency point being an absolute frequency point; and a DC reference offset of the at least one frequency layer, the DC reference offset indicating a location of the DC tone relative to the reference frequency point.

Example 19: The method of Example 18, wherein the DC reference offset indicates the location of the DC tone as a number of SCS offset relative to the reference frequency point, and wherein a numerology of the DC reference offset is same as a numerology of the positioning signal corresponding to the at least one frequency layer.

Example 20: The method of Example 1, wherein each network node of the plurality of network nodes is configured with one or more frequency layers corresponding to one or more positioning signals configured to be transmitted from that network node, each frequency layer being associated with a bandwidth of the corresponding positioning signal, and wherein, for at least one frequency layer of at least one network node, the notification includes: a DC positioning offset of the at least one frequency layer, the DC positioning offset indicating a location of the DC tone relative a subcarrier of the positioning signal corresponding to the at least one frequency layer.

Example 21: The method of Example 20, wherein the DC positioning offset indicates the location of the DC tone as a number of SCS offset relative to the subcarrier of the positioning signal corresponding to the at least one frequency layer, and wherein a numerology of the DC positioning offset is same as a numerology of the positioning signal corresponding to the at least one frequency layer.

Example 22: The method of Example 1, further comprising: receiving the plurality of positioning related measurements from the UE; and determining the position of the UE based on the plurality of positioning related measurements.

Example 23: A method of a UE, the method comprising: receiving, from a network entity, a notification of a plurality of DC tones of a plurality of network nodes; receiving, from the plurality of network nodes, a plurality of positioning signals; and determining a plurality of positioning related measurements of the plurality of positioning signals based on locations of the plurality of DC tones indicated in the notification.

Example 24: The method of Example 23, wherein the positioning signals are downlink reference signals, each downlink reference signal being a PRS, a CSI-RS, a DMRS, a PSS, an SSS, or a PTRS.

Example 25: The method of Example 23, wherein the plurality of network nodes includes: a serving network node serving the UE; and one or more neighboring network nodes of the serving network node.

Example 26: The method of Example 25, wherein the network entity is a location server, and wherein receiving the notification comprises receiving assistance data, the assistance data comprising: the DC tone of the serving network node, and the DC tones of the one or more neighboring network nodes.

Example 27: The method of Example 26, wherein the UE exchanges one or more positioning protocol messages with the network entity to receive the assistance data from the network entity, the positioning protocol messages being LPP messages.

Example 28: The method of Example 25, wherein the network entity is the serving network node, and wherein receiving the notification comprises receiving assistance data, the assistance data comprising the DC tones of the one or more neighboring network nodes.

Example 29: The method of Example 28, wherein the assistance data further comprises the DC tone of the serving network node.

Example 30: The method of Example 28, wherein the UE exchanges one or more configuration messages and/or one or more positioning protocol messages with the network entity to receive the assistance data from the network entity.

Example 31: The method of Example 29, wherein the configuration messages are RRC messages, and/or wherein the positioning protocol messages are LPP messages.

Example 32: The method of Example 28, further comprising: receiving a SIB message from the network entity, the SIB message including the DC tone of the serving network node.

Example 33: The method of Example 23, wherein determining the plurality of positioning related measurements of the plurality of positioning signals comprises: for at least one positioning signal of the plurality of positioning signals transmitted from at least one network node of the plurality of network nodes, measuring one or more REs of the at least one positioning signal; applying a weight to each measured RE of the at least one positioning signal; and deriving the positioning related measurement of the at least one positioning signal based on weighted measurements of the one or more REs of the at least one positioning signal, wherein for the at least one positioning signal, a coincident weight is applied to at least one RE when a tone of the at least one RE coincides with the DC tone of the at least one network node, and a non-coincident weight is applied to the at least one RE when the tone of the at least one RE does not coincide with the DC tone of the at least one network node, such that a contribution of the at least one RE in deriving the positioning related measurement of the at least one positioning signal when the coincident weight is applied is less than the contribution of the at least one RE in deriving the positioning related measurement of the at least one positioning signal when the non-coincident weight is applied.

Example 34: The method of Example 33, wherein when the at least one RE is assigned the coincident weight, the at least one RE makes no contribution in deriving the positioning related measurement of the at least one positioning signal.

Example 35: The method of Example 33, further comprising: determining the DC tone of the at least one network node; and determining, for each measured RE of the at least one positioning signal, whether that measured RE coincides with the DC tone of the at least one network node.

Example 36: The method of Example 35, wherein the notification includes a channel ID of the DC tone of the at least one network node, the channel ID being an absolute channel ID, and wherein determining the DC tone comprises determining a tone corresponding to the channel ID as the DC tone.

Example 37: The method of Example 35, wherein each network node of the plurality of network nodes is configured with one or more frequency layers corresponding to one or more positioning signals configured to be transmitted from that network node, each frequency layer being associated with a bandwidth of the corresponding positioning signal, wherein for the at least one network node, the notification includes: a reference frequency point of the frequency layer corresponding to the at least one positioning signal, the reference frequency point being an absolute frequency point; and a DC reference offset of the frequency layer corresponding to the at least one positioning signal, the DC reference offset indicating a location of the DC tone relative to the reference frequency point, and wherein determining the DC tone comprises determining the DC tone of the at least one network node based on the reference frequency point and the DC reference offset.

Example 38: The method of Example 37, wherein the DC reference offset indicates the location of the DC tone as a number of SCS offset relative to the reference frequency point, and wherein a numerology of the DC reference offset is same as a numerology of the at least one positioning signal.

Example 39: method of Example 35, wherein each network node of the plurality of network nodes is configured with one or more frequency layers corresponding to one or more positioning signals configured to be transmitted from that network node, each frequency layer being associated with a bandwidth of the corresponding positioning signal, wherein for the at least one network node, the notification includes: a DC positioning offset of the frequency layer corresponding to the at least one positioning signal, the DC positioning offset indicating a location of the DC tone relative a subcarrier of the at least one positioning signal, and wherein determining the DC tone comprises determining the DC tone of the at least one network node based on the subcarrier of the at least one positioning signal and the DC positioning offset.

Example 40: The method of Example 39, wherein the DC positioning offset indicates the location of the DC tone as a number of SCS offset relative to the subcarrier of the at least one positioning signal, and wherein a numerology of the DC positioning offset is same as a numerology of the at least one positioning signal.

Example 41: The method of Example 23, further comprising: determining the position of the UE based on the plurality of positioning related measurements; and/or sending the plurality of positioning related measurements to the network entity.

Example 42: A method of a network entity, the method comprising: receiving, from a UE, a notification of an uplink DC tone of the UE; sending the notification to a plurality of network nodes configured to receive one or more positioning signals from the UE; receiving, from the plurality of network nodes, a plurality of positioning related measurements of the one or more positioning signals transmitted from the UE; and determining a position of the UE based on the plurality of positioning related measurements.

Example 43: The method of Example 42, wherein the positioning signals are uplink reference signals, each uplink reference signal being an SRS, a DMRS, or a PTRS.

Example 44: The method of Example 42, wherein the plurality of network nodes includes: a serving network node serving the UE; and one or more neighboring network nodes of the serving network node.

Example 45: The method of Example 44, wherein the network entity is a location server, and wherein the network entity exchanges one or more positioning protocol messages with the UE to receive the notification, the positioning protocol messages comprising LPP messages, and/or exchanges one or more positioning protocol A messages with the plurality of network nodes to send the notification and to receive the plurality of positioning related measurements, the positioning protocol A messages comprising NRPPa and/or LPPa messages.

Example 46: The method of Example 44, wherein the network entity is the serving network node, and wherein the network entity sends the notification and receives the plurality of positioning related measurements through one or more interfaces to the one or more neighboring network nodes, the one or more interfaces comprising Xn and/or X2 interfaces.

Example 47: The method of Example 42, wherein the notification includes a channel ID of the uplink DC tone, the channel ID being an absolute channel ID.

Example 48: The method of Example 42, wherein the UE is configured with one or more frequency layers corresponding to one or more positioning signals configured to be transmitted from the UE, each frequency layer being associated with a bandwidth of the corresponding positioning signal, and wherein, for at least one frequency layer, the notification includes: a reference frequency point of the at least one frequency layer, the reference frequency point being an absolute frequency point; and a DC reference offset of the at least one frequency layer, the DC reference offset indicating a location of the uplink DC tone relative to the reference frequency point.

Example 49: The method of Example 48, wherein the DC reference offset indicates the location of the uplink DC tone as a number of SCS offset relative to the reference frequency point, and wherein a numerology of the DC reference offset is same as a numerology of the positioning signal corresponding to the at least one frequency layer.

Example 50: The method of Example 42, wherein the UE is configured with one or more frequency layers corresponding to one or more positioning signals configured to be transmitted from the UE, each frequency layer being associated with a bandwidth of the corresponding positioning signal, and wherein, for at least one frequency layer, the notification includes: a DC positioning offset of the at least one frequency layer, the DC positioning offset indicating a location of the uplink DC tone relative a subcarrier of the positioning signal corresponding to the at least one frequency layer.

Example 51: The method of Example 50, wherein the DC positioning offset indicates the location of the uplink DC tone as a number of SCS offset relative to the subcarrier of the positioning signal corresponding to the at least one frequency layer, and wherein a numerology of the DC positioning offset is same as a numerology of the positioning signal corresponding to the at least one frequency layer.

Example 52: A method of a UE, the method comprising: sending a notification of an uplink DC tone of the UE to a network entity for distribution to a plurality of network nodes; and transmitting one or more positioning signals to the plurality of network nodes.

Example 53: The method of Example 52, wherein the positioning signals are uplink reference signals, each uplink reference signal being an SRS, a DMRS, or a PTRS.

Example 54: The method of Example 52, wherein the plurality of network nodes includes: a serving network node serving the UE; and one or more neighboring network nodes of the serving network node.

Example 55: The method of Example 54, wherein the network entity is a location server, and wherein the UE exchanges one or more positioning protocol messages with the network entity to send the notification, the positioning protocol messages comprising LPP messages.

Example 56: The method of Example 54, wherein the network entity is the serving network node, and wherein the UE sends the notification as PUCCH and/or PUSCH messages.

Example 57: The method of Example 52, wherein the notification includes a channel ID of the uplink DC tone, the channel ID being an absolute channel ID.

Example 58: The method of Example 52, wherein the UE is configured with one or more frequency layers corresponding to one or more positioning signals configured to be transmitted from the UE, each frequency layer being associated with a bandwidth of the corresponding positioning signal, and wherein, for at least one frequency layer, the notification includes: a reference frequency point of the at least one frequency layer, the reference frequency point being an absolute frequency point; and a DC reference offset of the at least one frequency layer, the DC reference offset indicating a location of the uplink DC tone relative to the reference frequency point.

Example 59: The method of Example 58, wherein the DC reference offset indicates the location of the uplink DC tone as a number of SCS offset relative to the reference frequency point, and wherein a numerology of the DC reference offset is same as a numerology of the positioning signal corresponding to the at least one frequency layer.

Example 60: The method of Example 52, wherein the UE is configured with one or more frequency layers corresponding to one or more positioning signals configured to be transmitted from the UE, each frequency layer being associated with a bandwidth of the corresponding positioning signal, and wherein, for at least one frequency layer, the notification includes: a DC positioning offset of the at least one frequency layer, the DC positioning offset indicating a location of the uplink DC tone relative a subcarrier of the positioning signal corresponding to the at least one frequency layer.

Example 61: The method of Example 60, wherein the DC positioning offset indicates the location of the uplink DC tone as a number of SCS offset relative to the subcarrier of the positioning signal corresponding to the at least one frequency layer, and wherein a numerology of the DC positioning offset is same as a numerology of the positioning signal corresponding to the at least one frequency layer.

Example 62: A method of a network node, the method comprising: receiving, from a network entity, a notification of a DC tone of a UE; receiving, from the UE, one or more positioning signals; and determining positioning related measurements of the one or more positioning signals based on the notification.

Example 63: The method of Example 62, wherein the one or more positioning signals are uplink reference signals, each uplink reference signal being an SRS, a DMRS, or a PTRS.

Example 64: The method of Example 62, wherein the network entity is a location server, and wherein the network node exchanges one or more positioning protocol A messages with the network entity to receive the DC tone of the UE and/or to transmit the positioning related measurements of the one or more positioning signals, the positioning protocol A messages being NRPPa and/or LPPa messages.

Example 65: The method of Example 62, wherein the network entity is a serving network node serving the UE, and wherein the network node receives the DC tone of the UE and/or transmits the positioning related measurements of the one or more positioning signals through one or more interfaces to the one or more neighboring network nodes, the one or more interfaces comprising Xn and/or X2 interfaces.

Example 66: The method of Example 62, wherein determining the positioning related measurements of the one or more signals comprise: for at least one positioning signal of the one or more positioning signals transmitted from the UE, measuring one or more REs of the at least one positioning signal; applying a weight to each measured RE of the at least one positioning signal; and deriving the positioning related measurement of the at least one positioning signal based on weighted measurements of the one or more REs of the at least one positioning signal, wherein for the at least one positioning signal, a coincident weight is applied to at least one RE when a tone of the at least one RE coincides with the DC tone of the at least one network node, and a non-coincident weight is applied to the at least one RE when the tone of the at least one RE does not coincide with the DC tone of the at least one network node, such that a contribution of the at least one RE in deriving the positioning related measurement of the at least one positioning signal when the coincident weight is applied is less than the contribution of the at least one RE in deriving the positioning related measurement of the at least one positioning signal when the non-coincident weight is applied.

Example 67: The method of Example 66, wherein when the at least one RE is assigned the coincident weight, the at least one RE makes no contribution in deriving the positioning related measurement of the at least one positioning signal.

Example 68: The method of Example 66, further comprising: determining the DC tone of the UE; and determining, for each measured RE of the at least one positioning signal, whether that measured RE coincides with the DC tone of the UE.

Example 69: The method of Example 68, wherein the notification includes a channel ID of the DC tone of the UE, the channel ID being an absolute channel ID, and wherein determining the DC tone comprises determining a tone corresponding to the channel ID as the DC tone.

Example 70: The method of Example 68, wherein the UE is configured with one or more frequency layers corresponding to one or more positioning signals configured to be transmitted from the UE, each frequency layer being associated with a bandwidth of the corresponding positioning signal, wherein the notification includes: a reference frequency point of the frequency layer corresponding to the at least one positioning signal, the reference frequency point being an absolute frequency point; and a DC reference offset of the of the frequency layer corresponding to the at least one positioning signal, the DC reference offset indicating a location of the DC tone relative to the reference frequency point, and wherein determining the DC tone comprises determining the DC tone of the UE based on the reference frequency point and the DC reference offset.

Example 71: The method of Example 70, wherein the DC reference offset indicates the location of the DC tone as a number of SCS offset relative to the reference frequency point, and wherein a numerology of the DC reference offset is same as a numerology of the at least one positioning signal.

Example 72: The method of Example 68, wherein the UE is configured with one or more frequency layers corresponding to one or more positioning signals configured to be transmitted from the UE, each frequency layer being associated with a bandwidth of the corresponding positioning signal, wherein the notification includes: a DC positioning offset of the frequency layer corresponding to the at least one positioning signal, the DC positioning offset indicating a location of the DC tone relative a subcarrier of the at least one positioning signal, and wherein determining the DC tone comprises determining the DC tone of the UE based on the subcarrier of the at least one positioning signal and the DC positioning offset.

Example 73: The method of Example 72, wherein the DC positioning offset indicates the location of the DC tone as a number of SCS offset relative to the subcarrier of the at least one positioning signal, and wherein a numerology of the DC positioning offset is same as a numerology of the at least one positioning signal.

Example 74: The method of Example 62, further comprising: transmitting the one or more positioning related measurements to the network entity.

Example 75: A method of a base station, the method comprising: receiving, from a UE, a notification of an uplink DC tone of the UE; and transmitting the notification to a network entity for distribution to a plurality of network nodes.

Example 76: The method of Example 75, wherein: the network entity is a location server, and the base station exchanges one or more positioning protocol A messages with the network entity to send the notification, the positioning protocol A messages comprising LPPa or NRPPa messages.

Example 77: The method of Example 75, wherein the base station receives the notification from the UE in one or more physical uplink control channel (PUCCH) messages, one or more physical uplink shared channel (PUSCH) messages, or both.

Example 78: An apparatus for wireless communication comprising a processor, memory coupled with the processor, the processor and memory configured to perform a method of any one of examples 1 through 77.

Example 79: An apparatus for wireless communication comprising at least one means for performing a method of any one of examples 1 through 77.

Example 80: A non-transitory computer-readable medium storing code for wireless communication comprising a processor, memory coupled with the processor, and instructions stored in the memory and executable by the processor to cause the apparatus to perform a method of any one of examples 1 through 77.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of a network entity, the method comprising:
 receiving, from at least one or more neighboring network nodes, indications of a plurality of network nodes, indications of their respective direct current (DC) tones, the plurality of network nodes configured to transmit a respective plurality of positioning signals to a user equipment (UE);
 sending, to the UE, assistance data indicating a respective plurality of DC tones of the plurality of network nodes; and
 receiving, from the UE, a position of the UE determined based on a respective plurality of positioning related measurements of the plurality of positioning signals, the plurality of positioning related measurements of the plurality of positioning signals, or any combination thereof, the plurality of positioning signals comprising the plurality of DC tones.

2. The method of claim 1, wherein:
 the network entity is a location server,
 the plurality of DC tones comprises a DC tone for each of a serving network node of the plurality of network nodes and the one or more neighboring network nodes, and
 the method further comprises:
  receiving, from the serving network node, an indication of its DC tone prior to sending the assistance data.

3. The method of claim 1, wherein:
the network entity is a serving network node of the plurality of network nodes,
the DC plurality of tones comprises a DC tone for each of the serving network node and the one or more neighboring network nodes.

4. The method of claim 1, wherein for at least one network node of the plurality of network nodes, the assistance data includes a channel identifier (ID) of the DC tone of the at least one network node, the channel ID being an absolute channel ID.

5. The method of claim 1, wherein:
each network node of the plurality of network nodes is configured with one or more frequency layers corresponding to one or more positioning signals configured to be transmitted from that network node, each frequency layer being associated with a bandwidth of the corresponding positioning signal, and
for at least one frequency layer of at least one network node, the assistance data includes:
a reference frequency point of the at least one frequency layer, the reference frequency point being an absolute frequency point; and
a DC reference offset of the at least one frequency layer, the DC reference offset indicating a location of the DC tone relative to the reference frequency point.

6. The method of claim 5, wherein:
the DC reference offset indicates the location of the DC tone as a number of subcarriers spacing (SCS) offset relative to the reference frequency point, and
a numerology of the DC reference offset is same as a numerology of the positioning signal corresponding to the at least one frequency layer.

7. The method of claim 1, wherein:
each network node of the plurality of network nodes is configured with one or more frequency layers corresponding to one or more positioning signals configured to be transmitted from that network node, each frequency layer being associated with a bandwidth of the corresponding positioning signal, and
for at least one frequency layer of at least one network node, the assistance data includes:
a DC positioning offset of the at least one frequency layer, the DC positioning offset indicating a location of the DC tone relative a subcarrier of the positioning signal corresponding to the at least one frequency layer.

8. The method of claim 7, wherein:
the DC positioning offset indicates the location of the DC tone as a number of subcarriers spacing (SCS) offset relative to the subcarrier of the positioning signal corresponding to the at least one frequency layer, and
a numerology of the DC positioning offset is same as a numerology of the positioning signal corresponding to the at least one frequency layer.

9. A method of a user equipment (UE), the method comprising:
receiving, from a network entity, assistance data indicating a plurality of direct current (DC) tones of a respective plurality of network nodes, the plurality of network nodes comprising a serving network node and one or more neighboring network nodes;
receiving, from the plurality of network nodes, a plurality of positioning signals, the plurality of positioning signals comprising the plurality of DC tones;
determining a plurality of positioning related measurements of the plurality of positioning signals based on locations of the plurality of DC tones indicated in the assistance data; and
reporting the plurality of positioning related measurements, a position of the UE determined based on the plurality of positioning related measurements, or any combination thereof.

10. The method of claim 9, wherein determining the plurality of positioning related measurements of the plurality of positioning signals comprises:
for at least one positioning signal of the plurality of positioning signals transmitted from at least one network node of the plurality of network nodes,
measuring one or more resource elements (RE) of the at least one positioning signal;
applying a weight to each measured RE of the at least one positioning signal; and
deriving the positioning related measurement of the at least one positioning signal based on weighted measurements of the one or more REs of the at least one positioning signal.

11. The method of claim 10, wherein for the at least one positioning signal,
a coincident weight is applied to at least one RE when a tone of the at least one RE coincides with the DC tone of the at least one network node, and
a non-coincident weight is applied to the at least one RE when the tone of the at least one RE does not coincide with the DC tone of the at least one network node, such that
a contribution of the at least one RE in deriving the positioning related measurement of the at least one positioning signal when the coincident weight is applied is less than the contribution of the at least one RE in deriving the positioning related measurement of the at least one positioning signal when the non-coincident weight is applied.

12. The method of claim 10, wherein:
each network node of the plurality of network nodes is configured with one or more frequency layers corresponding to one or more positioning signals configured to be transmitted from that network node, each frequency layer being associated with a bandwidth of the corresponding positioning signal,
for the at least one network node, the assistance data includes:
a reference frequency point of the frequency layer corresponding to the at least one positioning signal, the reference frequency point being an absolute frequency point; and
a DC reference offset of the frequency layer corresponding to the at least one positioning signal, the DC reference offset indicating a location of the DC tone relative to the reference frequency point, and
the method further comprises determining the DC tone of the at least one network node based on the reference frequency point and the DC reference offset.

13. The method of claim 12, wherein:
the DC reference offset indicates the location of the DC tone as a number of subcarriers spacing (SCS) offset relative to the reference frequency point, and
a numerology of the DC reference offset is same as a numerology of the at least one positioning signal.

14. The method of claim 10, wherein:
each network node of the plurality of network nodes is configured with one or more frequency layers corresponding to one or more positioning signals configured to be transmitted from that network node, each frequency layer being associated with a bandwidth of the corresponding positioning signal, for the at least one network node, the assistance data includes:

a DC positioning offset of the frequency layer corresponding to the at least one positioning signal, the DC positioning offset indicating a location of the DC tone relative to a subcarrier of the at least one positioning signal, and the method further comprises determining the DC tone of the at least one network node based on the subcarrier of the at least one positioning signal and the DC positioning offset.

15. The method of claim 14, wherein:

the DC positioning offset indicates the location of the DC tone as a number of subcarriers spacing (SCS) offset relative to the subcarrier of the at least one positioning signal, and a numerology of the DC positioning offset is same as a numerology of the at least one positioning signal.

16. A method of a network entity, the method comprising:

receiving a notification of an uplink direct current (DC) tone of a user equipment (UE);

sending the notification to a plurality of network nodes configured to receive one or more uplink positioning signals from the UE, the plurality of network nodes comprising a serving network node and one or more neighboring network nodes;

receiving, from the plurality of network nodes, a plurality of positioning related measurements of the one or more uplink positioning signals transmitted from the UE, the one or more uplink positioning signals comprising the uplink DC tone of the UE; and determining a position of the UE based on the plurality of positioning related measurements.

17. The method of claim 16, wherein:

the network entity is a location server, the network entity exchanges one or more positioning protocol A messages with a serving base station of the UE to receive the notification, the positioning protocol A messages comprising New Radio positioning protocol type A (NRPPa) or Long-Term Evolution (LTE) positioning protocol (LPP) type A (LPPa) messages, and the network entity exchanges one or more positioning protocol A messages with the plurality of network nodes to send the notification and to receive the plurality of positioning related measurements, the positioning protocol A messages comprising NRPPa or LPPa messages.

18. The method of claim 16, wherein:

the network entity is a location server, and the network entity exchanges one or more positioning protocol messages with the UE to receive the notification, the positioning protocol messages comprising Long-Term Evolution (LTE) positioning protocol (LPP) messages, and the network entity exchanges one or more positioning protocol A messages with the plurality of network nodes to send the notification and to receive the plurality of positioning related measurements, the positioning protocol A messages comprising NRPPa or LPPa messages.

19. The method of claim 16, wherein:

the network entity is the serving network node of the plurality of network nodes, and the network entity sends the notification and receives the plurality of positioning related measurements through one or more interfaces to the one or more neighboring network nodes, the one or more interfaces comprising Xn or X2 interfaces.

20. A method of a base station, the method comprising:

receiving, from a user equipment (UE), a notification of an uplink direct current (DC) tone of the UE; and transmitting the notification to a network entity for distribution to a plurality of network nodes to enable the plurality of network nodes to obtain a plurality of positioning related measurements of one or more uplink positioning signals transmitted from the UE, the one or more uplink positioning signals comprising the uplink DC tone of the UE, the plurality of network nodes comprising a serving network node and one or more neighboring network nodes.

21. The method of claim 20, wherein:

the network entity is a location server, and the base station exchanges one or more positioning protocol A messages with the network entity to send the notification, the positioning protocol A messages comprising Long-Term Evolution (LTE) positioning protocol (LPP) type A (LPPa) or New Radio positioning protocol type A (NRPPa) messages.

22. The method of claim 20, wherein the base station receives the notification from the UE in one or more physical uplink control channel (PUCCH) messages, one or more physical uplink shared channel (PUSCH) messages, or both.

23. A network entity, comprising:

a memory;

a communication device; and at least one processor communicatively coupled to the memory and the communication device, the at least one processor configured to:

receive, via the communication device, from at least one or more neighboring network nodes of a plurality of network nodes, indications of their respective direct current (DC) tones, the plurality of network nodes configured to transmit a respective plurality of positioning signals to a user equipment (UE);

cause the communication device to send, to the UE, a assistance data indicating a respective plurality of DC tones of the plurality of network nodes; and receive, from the UE via the communication device, a position of the UE determined based on a respective plurality of positioning related measurements of the plurality of positioning signals, the plurality of positioning related measurements of the plurality of positioning signals, or any combination thereof, the plurality of positioning signals comprising the plurality of DC tones.

24. A user equipment (UE), comprising:

a memory;

at least one transceiver; and at least one processor communicatively coupled to the memory and the at least one transceiver, the at least one processor configured to:

receive, from a network entity via the at least one transceiver, assistance data indicating a plurality of direct current (DC) tones of a respective plurality of network nodes, the plurality of network nodes comprising a serving network node and one or more neighboring network nodes;

receive, from the plurality of network nodes via the at least one transceiver, a plurality of positioning signals, the plurality of positioning signals comprising the plurality of DC tones;

determine a plurality of positioning related measurements of the plurality of positioning signals based on locations of the plurality of DC tones indicated in the assistance data; and report the plurality of positioning related measurements, a position of the UE determined based on the plurality of positioning related measurements, or any combination thereof.

25. A network entity, comprising:

a memory;

a communication device; and at least one processor communicatively coupled to the memory and the communication device, the at least one processor configured to:

receive, via the communication device, a notification of an uplink direct current (DC) tone of a user equipment (UE);

cause the communication device to send the notification to a plurality of network nodes configured to receive one or more uplink positioning signals from the UE, the plurality of network nodes comprising a serving network node and one or more neighboring network nodes;

receive, from the plurality of network nodes via the communication device, a plurality of positioning related measurements of the one or more uplink positioning signals transmitted from the UE, the one or more uplink positioning signals comprising the uplink DC tone of the UE; and determine a position of the UE based on the plurality of positioning related measurements.

26. A base station, comprising:

a memory;

a communication device; and at least one processor communicatively coupled to the memory and the communication device, the at least one processor configured to:

receive, from a user equipment (UE) via the communication device, a notification of an uplink direct current (DC) tone of the UE; and cause the communication device to transmit the notification to a network entity for distribution to a plurality of network nodes to enable the plurality of network nodes to obtain a plurality of positioning related measurements of one or more uplink positioning signals transmitted from the UE, the one or more uplink positioning signals comprising the uplink DC tone of the UE, the plurality of network nodes comprising a serving network node and one or more neighboring network nodes.

27. A network entity, comprising:

means for receiving, from at least one or more neighboring network nodes of a plurality of network nodes, indications of their respective direct current (DC) tones, the plurality of network nodes configured to transmit a respective plurality of positioning signals to a user equipment (UE);

means for sending, to the UE, assistance data indicating a respective plurality of DC tones of the plurality of network nodes; and means for receiving, from the UE, a position of the UE determined based on a respective plurality of positioning related measurements of the plurality of positioning signals, the plurality of positioning related measurements of the plurality of positioning signals, or any combination thereof, the plurality of positioning signals comprising the plurality of DC tones.

28. A user equipment (UE), comprising:

means for receiving, from a network entity, assistance data indicating a plurality of direct current (DC) tones of a respective plurality of network nodes, the plurality of network nodes comprising a serving network node and one or more neighboring network nodes;

means for receiving, from the plurality of network nodes, a plurality of positioning signals, the plurality of positioning signals comprising the plurality of DC tones;

means for determining a plurality of positioning related measurements of the plurality of positioning signals based on locations of the plurality of DC tones indicated in the assistance data; and means for reporting the plurality of positioning related measurements, a position of the UE determined based on the plurality of positioning related measurements, or any combination thereof.

29. A network entity, comprising:

means for receiving a notification of an uplink direct current (DC) tone of a user equipment (UE);

means for sending the notification to a plurality of network nodes configured to receive one or more uplink positioning signals from the UE, the plurality of network nodes comprising a serving network node and one or more neighboring network nodes;

means for receiving, from the plurality of network nodes, a plurality of positioning related measurements of the one or more uplink positioning signals transmitted from the UE, the one or more uplink positioning signals comprising the uplink DC tone of the UE; and means for determining a position of the UE based on the plurality of positioning related measurements.

30. A base station, comprising:

means for receiving, from a user equipment (UE), a notification of an uplink direct current (DC) tone of the UE; and means for transmitting the notification to a network entity for distribution to a plurality of network nodes to enable the plurality of network nodes to obtain a plurality of positioning related measurements of one or more uplink positioning signals transmitted from the UE, the one or more uplink positioning signals comprising the uplink DC tone of the UE, the plurality of network nodes comprising a serving network node and one or more neighboring network nodes.

* * * * *